United States Patent
Grossmann et al.

(10) Patent No.: US 12,302,321 B2
(45) Date of Patent: *May 13, 2025

(54) METHODS AND APPARATUSES FOR ENHANCING THE RELIABILITY AND PERFORMANCE OF THE PHYSICAL DOWNLINK CONTROL CHANNEL IN A WIRELESS COMMUNICATIONS NETWORK

(71) Applicant: Fraunhofer-Gesellschaft zur Förderung der angewandten Forschung e.V., Munich (DE)

(72) Inventors: Marcus Grossmann, Erlangen (DE); Markus Landmann, Erlangen (DE); Sutharshun Varatharaajan, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,385

(22) Filed: Oct. 16, 2023

(65) Prior Publication Data

US 2024/0073896 A1 Feb. 29, 2024

Related U.S. Application Data

(63) Continuation of application No. 17/922,481, filed as application No. PCT/EP2021/061760 on May 4, 2021, now Pat. No. 11,818,712.

(30) Foreign Application Priority Data

May 4, 2020 (EP) ..................................... 20172788
Sep. 15, 2020 (EP) ..................................... 20196152

(Continued)

(51) Int. Cl.
*H04L 1/00* (2006.01)
*H04W 24/08* (2009.01)
(Continued)

(52) U.S. Cl.
CPC ....... *H04W 72/1273* (2013.01); *H04L 1/0038* (2013.01); *H04W 24/08* (2013.01); *H04W 72/23* (2023.01)

(58) Field of Classification Search
CPC . H04W 72/1273; H04W 72/23; H04W 24/08; H04L 1/0038
See application file for complete search history.

(56) References Cited

U.S. PATENT DOCUMENTS

2017/0374653 A1 12/2017 Lee et al.
2019/0045533 A1 2/2019 Chatterjee et al.
(Continued)

FOREIGN PATENT DOCUMENTS

CN 110474751 A1 11/2019
WO WO 2019139955 A1 7/2019

OTHER PUBLICATIONS

International Search Report and the Written Opinion of the International Searching Authority, International Application No. PCT/EP2021/061760, Jul. 5, 2021, European Patent Office.
(Continued)

*Primary Examiner* — Chi Ho A Lee
(74) *Attorney, Agent, or Firm* — Burr & Forman LLP; Nathaniel T. Quirk

(57) ABSTRACT

Methods and apparatuses for enhancing the reliability and performance of the PDCCH in a wireless network. The method performed by a UE comprises: receiving a configuration of search space sets for the PDCCH, each search space set comprises a number of PDCCH candidates made up of a number of resource elements; monitoring for DCIs (Continued)

of a specific format as indicated in the configured PDCCH candidates; wherein a configuration an indication of an association of the search space sets with a search space set pool is provided to the UE, and at least two PDCCH candidates from the search space sets are associated with the same DCI content, or an association of two or more TCI states with a single CORESET is obtained from the network node; and applying the configuration(s) or indication of the association for receiving one or more PDCCH(s) on the search space sets.

19 Claims, 11 Drawing Sheets

(30) Foreign Application Priority Data

Oct. 16, 2020 (EP) .................................... 20202421
Dec. 3, 2020 (EP) .................................... 20211637

(51) Int. Cl.
*H04W 72/1273* (2023.01)
*H04W 72/23* (2023.01)

(56) References Cited

U.S. PATENT DOCUMENTS

| | | |
|---|---|---|
| 2019/0191360 A1 | 6/2019 | Sun et al. |
| 2019/0296847 A1 | 9/2019 | Sun et al. |
| 2021/0105105 A1 | 4/2021 | Xu et al. |
| 2021/0144599 A1* | 5/2021 | Awoniyi-Oteri ...... H04W 36/08 |
| 2022/0038207 A1* | 2/2022 | Frenne .................. H04L 1/0072 |
| 2022/0116143 A1 | 4/2022 | Luo et al. |
| 2022/0124686 A1 | 4/2022 | Lee et al. |
| 2022/0159701 A1 | 5/2022 | Islam et al. |
| 2023/0021700 A1 | 1/2023 | Lin |
| 2023/0062005 A1 | 3/2023 | Su et al. |
| 2023/0076897 A1* | 3/2023 | Svedman .............. H04W 72/23 |
| 2023/0163919 A1* | 5/2023 | Jiang ................. H04L 27/26025 370/329 |

OTHER PUBLICATIONS

International Preliminary Report on Patentability, International Application No. PCT/EP2021/061760, May 5, 2022, European Patent Office.
3GPP TSG RAN WG1 #96, Enhancements on multi-TRP/panel transmission, Feb. 25-Mar. 1, 2019, R1-1902091.
3GPP TSG RAN WG1 Meeting RAN1#98, On multi-TRP and multi-panel, Aug. 26-30, 2019, R1-1908990.

* cited by examiner

```
ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER (0..maxNrofPhysicalResourceBlocks-1)    OPTIONAL -- Need S
        },
        nonInterleaved                  NULL
    },
    precoderGranularity             ENUMERATED {sameAsREG-bundle, allContiguousRBs},
    tci-StatesPDCCH-ToAddList        SEQUENCE(SIZE (1..maxNrofTCI-StatesPDCCH)) OF TCI-StateId OPTIONAL, -- Cond NotSIB1-initialBWP
    tci-StatesPDCCH-ToReleaseList    SEQUENCE(SIZE (1..maxNrofTCI-StatesPDCCH)) OF TCI-StateId OPTIONAL, -- Cond NotSIB1-initialBWP
    tci-PresentInDCI                 ENUMERATED {enabled}                                    OPTIONAL, -- Need S
    pdcch-DMRS-ScramblingID          INTEGER (0..65535)                                      OPTIONAL, -- Need S
    ...
}
```

Figure 1: Higher configuration of a CORESET (SoTA [6])

```
SearchSpace ::=           SEQUENCE {
    searchSpaceId             SearchSpaceId,
    controlResourceSetId      ControlResourceSetId                          OPTIONAL,   -- Cond SetupOnly
    monitoringSlotPeriodicityAndOffset  CHOICE {
        ...
    }                                                                      OPTIONAL,   -- Cond Setup
    duration                  INTEGER (2..2559)                            OPTIONAL,   -- Need R
    monitoringSymbolsWithinSlot  BIT STRING (SIZE (14))                    OPTIONAL,   -- Cond Setup
    nrofCandidates            SEQUENCE {
        aggregationLevel1        ENUMERATED {n0, n1, n2, n3, n4, n5, n6, n8},
        aggregationLevel2        ENUMERATED {n0, n1, n2, n3, n4, n5, n6, n8},
        aggregationLevel4        ENUMERATED {n0, n1, n2, n3, n4, n5, n6, n8},
        aggregationLevel8        ENUMERATED {n0, n1, n2, n3, n4, n5, n6, n8},
        aggregationLevel16       ENUMERATED {n0, n1, n2, n3, n4, n5, n6, n8}
    },
    searchSpaceType           CHOICE {
        common                    SEQUENCE {
            dci-Format0-0-AndFormat1-0   SEQUENCE {
                ...
            }                                                              OPTIONAL,   -- Cond Setup
            dci-Format2-0            SEQUENCE {
                nrofCandidates-SFI       SEQUENCE {
                    aggregationLevel1        ENUMERATED {n1, n2},
                    aggregationLevel2        ENUMERATED {n1, n2},
                    aggregationLevel4        ENUMERATED {n1, n2},
                    aggregationLevel8        ENUMERATED {n1, n2},
                    aggregationLevel16       ENUMERATED {n1, n2}
                },
                ...
            }                                                              OPTIONAL,   -- Need R
            dci-Format2-1            SEQUENCE {
                ...
            }                                                              OPTIONAL,   -- Need R
            dci-Format2-2            SEQUENCE {
                ...
            }                                                              OPTIONAL,   -- Need R
            dci-Format2-3            SEQUENCE {
                dummy1                   ENUMERATED {sl1, sl2, sl4, sl5, sl8, sl10, sl16, sl20} OPTIONAL,   -- Cond Setup
                dummy2                   ENUMERATED {n1, n2}
            }                                                              OPTIONAL,   -- Need R
        },
        ue-Specific               SEQUENCE {
            dci-Formats              ENUMERATED {formats0-0-And-1-0, formats0-1-And-1-1},
            ...
        }                                                                  OPTIONAL    -- Cond Setup
    }
}
```

Figure 2: Higher layer configuration of a search space set (SoTA) [6])

```
MIB ::=                           SEQUENCE {
    systemFrameNumber                 BIT STRING (SIZE (6)),
    subCarrierSpacingCommon           ENUMERATED {scs15or60, scs30or120},
    ssb-SubcarrierOffset              INTEGER (0..15),
    dmrs-TypeA-Position               ENUMERATED {pos2, pos3},
    pdcch-ConfigSIB1                  PDCCH-ConfigSIB1,
    cellBarred                        ENUMERATED {barred, notBarred},
    intraFreqReselection              ENUMERATED {allowed, notAllowed},
    spare                             BIT STRING (SIZE (1))
}

PDCCH-ConfigSIB1 ::=              SEQUENCE {
    controlResourceSetZero            ControlResourceSetZero,
    searchSpaceZero                   SearchSpaceZero
}
```

Figure 3: The MIB provided to the UE via the RRC (SoTA [6])

```
TCI-State ::=        SEQUENCE {
    tci-StateId      TCI-StateId,
    qcl-Type1        QCL-Info,
    qcl-Type2        QCL-Info                                OPTIONAL,    -- Need R
    ...
}

QCL-Info ::=         SEQUENCE {
    cell             ServCellIndex
    bwp-Id           BWP-Id                                  OPTIONAL,    -- Need R
    referencesignal  CHOICE {
        csi-rs           NZP-CSI-RS-ResourceId,
        ssb              SSB-Index
    },
    qcl-Type         ENUMERATED {typeA, typeB, typeC, typeD},
    ...
}
```

Figure 4: RRC configuration of the TCI-state information element (SoTA [6])

```
SearchSpace ::=              SEQUENCE {
  searchSpaceId                SearchSpaceId,
  searchSpaceSetPoolIndex      SearchSpaceSetPoolIndex         OPTIONAL,   -- Cond SetupOnly
  controlResourceSetId         ControlResourceSetId            OPTIONAL,   -- Cond SetupOnly
  monitoringSlotPeriodicityAndOffset  CHOICE {
    ...
  }
  duration                     INTEGER (2..2559)               OPTIONAL,   -- Cond Setup
  monitoringSymbolsWithinSlot  BIT STRING (SIZE (14))          OPTIONAL,   -- Need R
  nrofCandidates               SEQUENCE {                      OPTIONAL,   -- Cond Setup
    aggregationLevel1            ENUMERATED {n0, n1, n2, n3, n4, n5, n6, n8},
    aggregationLevel2            ENUMERATED {n0, n1, n2, n3, n4, n5, n6, n8},
    aggregationLevel4            ENUMERATED {n0, n1, n2, n3, n4, n5, n6, n8},
    aggregationLevel8            ENUMERATED {n0, n1, n2, n3, n4, n5, n6, n8},
    aggregationLevel16           ENUMERATED {n0, n1, n2, n3, n4, n5, n6, n8}
  },
  searchSpaceType              CHOICE {                        OPTIONAL,   -- Cond Setup
    common                       SEQUENCE {
      ... DCI formats and related parameters ...
    },
    ue-Specific                  SEQUENCE {
      dci-Formats                  ENUMERATED {formats0-0-And-1-0, formats0-1-And-1-1},
      ...
    }
  }
}                                                              OPTIONAL    -- Cond Setup
```

Figure 5: New higher layer configuration of a SS set comprising a SS pool index

```
SearchSpaceSetPool ::=       SEQUENCE {
    searchSpaceSetPoolId      SearchSpaceSetPoolId,                                    OPTIONAL  -- Cond Setup
    searchSpaceSetList        SEQUENCE (SIZE (1.. maxNrofSearchSpaces)) OF SearchSpaceId
                                                                                       OPTIONAL  -- Cond Setup
}
```

Figure 6: New higher layer configuration of a SS set pool information element comprising a list of SS set IDs

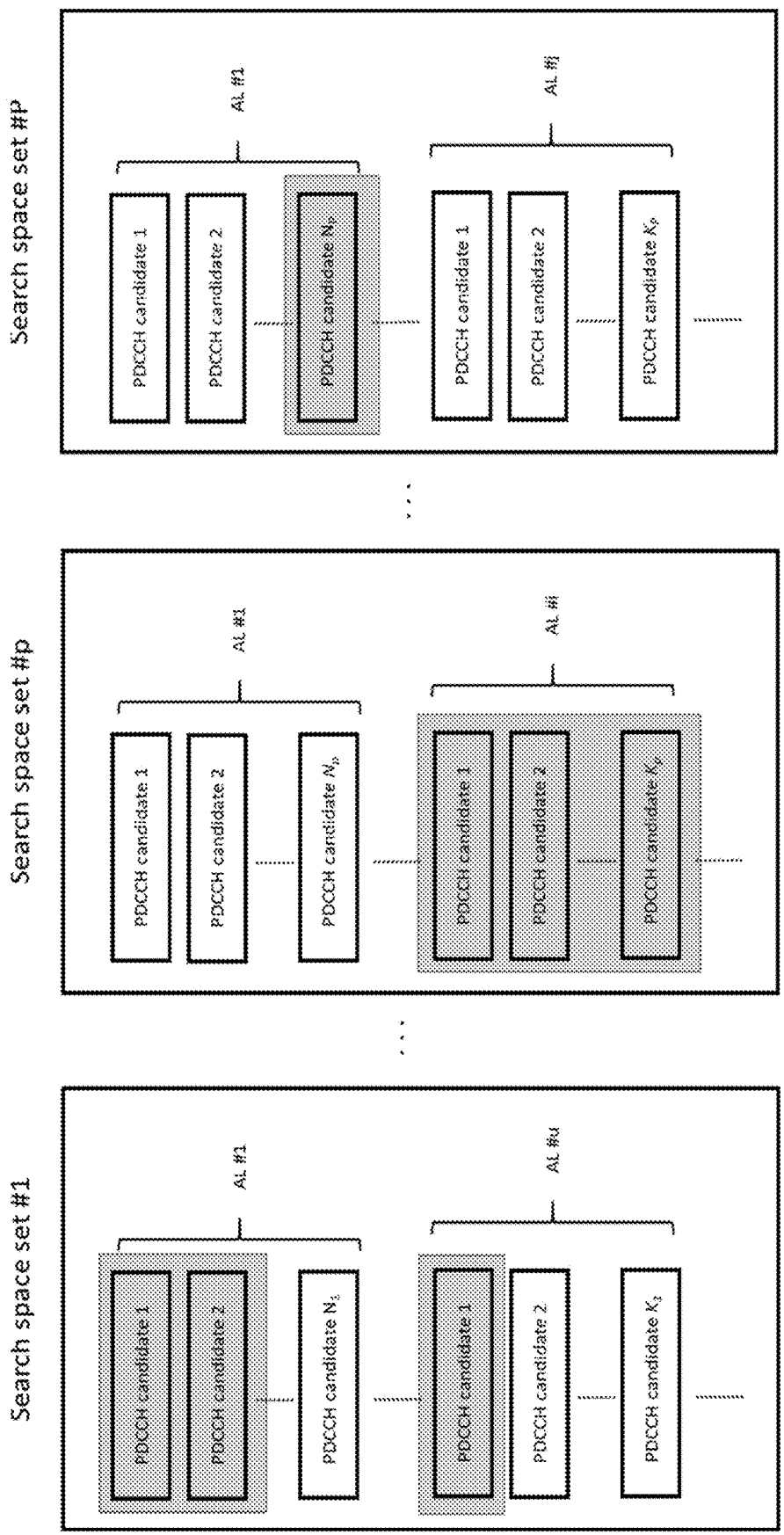
Figure 7: Associates of multiple PDCCH candidates from different SS sets in a SS set pool associated with the same DCI content ND APPARATUSES FOR
ENHANCING THE RELIABILITY AND
PERFORMANCE OF THE PHYSICAL
DOWNLINK CONTROL CHANNEL IN A
WIRELESS COMMUNICATIONS NETWORK

CROSS-REFERENCE TO RELATED APPLICATION

This application is a continuation of U.S. patent application Ser. No. 17/922,481 filed on Oct. 31, 2022, which is a national stage application, filed under 35 U.S.C. § 371, of International Patent Application No. PCT/EP2021/061760 filed on May 4, 2021, and European Patent Applications EP20172788.0, filed on May 4, 2020, EP20196152.1, filed on Sep. 15, 2020, EP20202421.2, filed on Oct. 16, 2020, and 20211637.2, filed on Dec. 3, 2020, which are incorporated by reference herein in their entirety.

TECHNICAL FIELD

The present disclosure relates to the field of wireless communications, and in particular to methods and apparatuses for enhancing the reliability and performance of the physical downlink control channel (PDCCH) in a wireless communications network such as advanced 5G networks.

BACKGROUND

In the third generation partnership project new radio (3GPP NR), also known as 5G, and its further releases [1-6], the physical downlink control channel (PDCCH) carries the downlink control information (DCI) that is used for one of the following: scheduling of the physical downlink shared channel (PDSCH) or the physical uplink shared channel (PUSCH), slot format indication, power control command transmission, scheduling of NR/LTE sidelink channel, cancelling of uplink (UL) transmission and power saving information among others. In ultra-reliable low-latency communication (URLLC) systems, which is a vital use-case in the deployment of 5G systems, reliable transmission of the DCI is necessary for the robustness and performance of other physical channels. So far in 3GPP standardization, various transmission acknowledgement maneuvers, link adaptation measures, and various physical (PHY)-layer and higher layer signaling procedures exist to aid in URLLC communications. In the context of multiple-input-multiple-output (MIMO) communications, the URLLC use cases may be supported via multiple transmit-receive-point (TRP) transmissions.

In millimeter wave (mmWave) frequencies (frequency range 2 (FR2)), i.e., frequencies above 6 GHz, in general, wireless communication between communication devices is performed with spatially selective/directive transmissions and receptions called beams. The term 'beam' is used in the following to denote a spatially selective/directive transmission of an outgoing signal or reception of an incoming signal which is achieved by precoding/filtering the signal at the antenna ports of the device with a set of coefficients. The word precoding or filtering may refer to processing of the signal in the analog or digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

The term 'higher layer' in the following, when used in isolation, denotes any communication layer above the physical layer in the protocol stack.

The term serving cell and carrier component (CC) may be used interchangeably in this disclosure as a serving cell configured for a UE and is usually a separate physical carrier with a certain carrier frequency. Depending on the frequency of a component carrier/serving cell, the size of the cell and the beamformed reference signals may vary. Each serving cell or component carrier comprises $N_{BWP} \geq 1$ bandwidth parts (BWP) which is a set of frequency domain resources. At any given time instant in a serving cell, the UE may receive physical layer transmissions from a TRP or any other network element in one of the configured BWPs in the DL in the cell and may perform transmissions in one of the configured BWPs in the UL in the cell.

In the following, the state of the art (SoTA) on physical layer downlink (DL) channels, especially the PDCCH, is provided. The issues to be considered to schedule PDCCH transmissions from multiple TRPs are then discussed followed by a discussion on PDCCH reliability, robustness and performance in a multi-TRP context.

It is to be noted that any mention of an action performed by a gNodeB (gNB) can also be performed by any other element of the network and hence any concerned statement shall be read as such.

Physical Downlink Control Channel (Pdcch)

The PDCCH is configured at the radio resource control (RRC) layer level by a base station or a network node or a gNodeB (gNB). The gNB transmits the PDCCH(s) on one or more control resource sets (CORESETs) that are configured at RRC level as shown in FIG. 1. A CORESET is a set of resources where control information may be transmitted to the UE. A CORESET comprises of $NR_{RB}^{CORESET}$ resource blocks (RBs) in the frequency domain (given by the higher layer parameter frequencyDomainResources) and $N_{symb}^{CORESET} \in \{1,2,3\}$ symbols in the time domain (given by the higher layer parameter duration). The UE may be configured with up to 3 CORESETs per BWP per serving cell [1].

Each CORESET comprises one or more control channel elements (CCEs). Each CCE comprises 6 resource element groups (REGs), where each REG equals one resource block in one orthogonal frequency division multiplexing (OFDM) symbol. Resource-element groups within a CORESET are numbered in increasing order in a time-first manner, starting with 0 for the first OFDM symbol and the lowest-numbered resource block in the control resource set [1]. Each CORESET is associated with a CCE-to-REG mapping. The CCE-to-REG mapping for a CORESET can be interleaved or non-interleaved and is described by REG bundles as provided in [1]. A REG bundle may comprise 2, 3 or 6 REGs.

A PDCCH carrying a DCI for one of the following purposes may be transmitted on one or more CCEs:
scheduling of the PDSCH or the PUSCH or NR/LTE sidelink channel, or
slot format indication, or
power control command transmission, or
cancelling of UL transmission, or
power saving information notification, or
soft resources availability notification, among others.

The number of CCEs used for a PDCCH is indicated by an 'aggregation level'. If a PDCCH has an aggregation level of 4, the PDCCH is transmitted on 4 CCEs. The possible values for 'aggregation level' are 1, 2, 4, 8 and 16 [1]. A DCI of aggregation level L comprises L continuously numbered CCEs, and the CCEs are mapped on a number of REGs on a CORESET. The type of CCE-to-REG mapping used in a CORESET—interleaved or non-interleaved—and details regarding the mapping are provided in the corresponding CORESET configuration [6].

It should be noted that the terms PDCCH and DCI may be used interchangeably in this disclosure. Both terms refer to a downlink control channel information obtained via the physical layer.

The UE searches for valid PDCCH(s)/DCI(s) in the PDCCH candidates on configured search space sets on the CORESETs. A search space set that the UE searches for PDCCH candidates on a CORESET are provided via the higher layer configuration of the search space (SS) set—the information element SearchSpace as shown in FIG. 2. Each search space set is associated with a CORESET via higher layer configuration as shown in FIG. 2 and comprises the number of PDCCH candidates in a given aggregation level where the UE performs blind decoding on in search of a valid PDCCH/DCI. The blind decoding process involves, in addition to error correction decoding, the unscrambling of the cyclic redundancy check (CRC) bits of each PDCCH candidate in every search space set with various radio network temporary identifier (RNTI) values that they can be possibly scrambled with and performing the CRC check to verify if the CCEs corresponding to the PDCCH candidate comprise a valid DCI according to the DCI formats to be monitored for the given search space set.

There are two types of SS sets [3] [6]:
Common search space (CSS) sets—commonly monitored by a group of UEs in the cell, and
UE-specific search space (USS) sets—monitored by an individual UE.

The categorization of the search space (SS) into one of the two types above is achieved by setting the parameter searchSpaceType in SearchSpace to 'common' or 'ue-Specific'. Each search space set is associated with a CORE-SET—the ID of the associated CORESET is provided in controlResourceSetId in the higher layer configuration SearchSpace. The UE may be configured with up to 10 search space sets per DL BWP in a serving cell, i.e., there can be a maximum of 40 configured search space sets in a serving cell, wherein each configured search space set is provided with a SearchSpaceId.

Apart from the CORESETs and the search space sets configured as indicated above, CORESET 0 and searchSpaceZero are separately provided to the UE. CORE-SET 0 is configured using the master information block (MIB) as shown in FIG. 3, obtained from the cell-defining synchronization signal and physical broadcast channel (PBCH) block (SSB). CORESET 0 can be acquired even before higher-layer configurations are provided, i.e., before additional system information or dedicated configuration is provided, while its configuration is restricted to a limited number of combinations of parameters compared to other CORESETs. Similarly, search space 0, which is a common search space set, is also provided to the UE by the MIB as shown in FIG. 3 and its configuration is restricted to a limited number of combinations of parameters compared to other search space sets.

The PDCCH(s) transmitted on common search space sets (CSSs) provide paging information, random access procedure information, system information block 1 (SIB1) and other system information to the UE among others. The higher layer configuration PDCCH-ConfigCommon provides the IDs of the search space sets used to obtain each of the aforementioned information [6]. It also provides the list of common search spaces and optionally, the configuration of a common CORESET that can be used for any common or UE-specific search space, which is contained in the bandwidth of CORESET 0.

PDCCH Overbooking

The UE is capable of monitoring, i.e., performing blind decoding, only a limited number of PDCCH candidates. The number of PDCCH candidates that a UE is capable of monitoring in a serving cell in a given slot is specified in the 3GPP Rel. 16 standard and is dependent on the numerology of the serving cell. However, the gNB is allowed to configure or schedule more PDCCH candidates than the UE is able to monitor/decode, i.e., the gNB is allowed to overbook PDCCH(s) for the UE, so that the full capability of the UE can be utilised.

The UE capability in monitoring PDCCH candidates can be provided to the gNB in two different types:

Type 1: The UE can monitor up to $M_{PDCCH}^{max,\mu}$ PDCCH candidates in a slot in a given cell with numerology $\mu$. The UE may also perform channel estimations of up to $C_{PDCCH}^{max,\mu}$ CCEs in a slot in a given cell with numerology $\mu$. These values are fixed in the specifications (Table 10.1-2 and Table 10.1-3 in [3]).

Type 2: The UE can monitor up to $M_{PDCCH}^{max,(X,Y),\mu}$ PDCCH candidates in a slot in a given cell with numerology $\mu$ and span pattern (X,Y). The UE may also perform channel estimations of up to $C_{PDCCH}^{max,(X,Y),\mu}$ CCEs in a slot in a given cell with numerology $\mu$ and span pattern (X,Y). These values are provided in the specifications (Table 10.1-2A and Table 10.1-3A in [3]). A span pattern (X,Y) means that at least two PDCCH occasions in a slot may occur with the first symbol of each occasion separated by at least X symbols and each occasion spans Y consecutive symbols.

The type 2 based UE monitoring capability may be assumed by the gNB when the UE reports that it has the capability to monitor a certain span pattern.

In 3GPP Rel. 15, each UE has a capability of monitoring $N_{cells}^{cap}$. If $N_{cells}^{DL} < N_{cells}^{cap}$ are configured to the UE, $M_{PDCCH}^{max,\mu}$ or $M_{PDCCH}^{max,(X,Y),\mu}$ candidates can be monitored and channel estimation for up to $C_{PDCCH}^{max,\mu}$ or $C_{PDCCH}^{max,(X,Y),\mu}$ CCEs can be performed by the UE in $N_{cells}^{DL,\mu}$ with numerology $\mu$. If not, the UE is not required to monitor more than $$\left\lfloor N_{cells}^{cap} \cdot M_{PDCCH}^{max,\mu} \cdot N_{cells}^{DL,\mu} \Big/ \sum_{j=0}^{3} N_{cells}^{DL,\mu} \right\rfloor$$

PDCCH candidates and the UE is not required to estimate the channel for more than $$\left\lfloor N_{cells}^{cap} \cdot C_{PDCCH}^{max,\mu} \cdot N_{cells}^{DL,\mu} \Big/ \sum_{j=0}^{3} N_{cells}^{DL,\mu} \right\rfloor$$

in the $N_{cells}^{DL,\mu}$ with numerology $\mu$.

In 3GPP Rel. 16, PDCCH monitoring was enhanced to employ multi-TRP transmissions wherein PDCCHs from multiple TRPs may be received and each CORESET is associated with a specific TRP. The following enhancements were introduced:

The UE is configured with $N_{cells,0}^{DL}$ cells, wherein PDCCHs in the respective cells are received on CORE-SETs in the cell that are not configured with CORE- SETpoolIndex values or the CORESETs are configured only with CORESETpoolIndex value 0 (single-TRP cells may have no CORESETpoolIndex values configured or may be configured only with CORESETpoolIndex 0) and the UE is configured with $N_e$De s, cells, wherein PDCCHs in the respective cells are received on CORESETs in the cell configured with two different values of CORESETpoolIndex—0 or 1 (multi-TRP cells may have CORESETs configured with CORESETpoolIndex values 0 or 1).

A parameter R (or γ) has been introduced. The number of PDCCH candidates from the UEs capability that are monitored in cells configured with CORESETs associated with more than one CORESETpoolIndex value (i.e., multi-TRP cells) during overbooking is increased by a factor of γ compared to the cells configured with CORESETs associated with only one CORESETpoolIndex value or not associated with any CORESETpoolIndex value (i.e., single-TRP cell) (the value for γ is either higher layer configured or a default value is provided [3], and the UE may report its capability for the value of γ), i.e.,
when $$\sum\nolimits_{\mu=0}^{3} \left( N_{cells,0}^{DL,\mu} + \gamma \cdot N_{cells,1}^{DL,\mu} \right) \le N_{cells}^{cap},$$

the UE is not required to monitor more than $M_{PDCCH}^{max,\mu}$ PDCCH candidates and to perform channel estimation for more than $C_{PDDCH}^{max,\mu}$ CCEs in $N_{cells,0}^{DL,\mu}$ single TRP cells with numerology μ; and the UE is not required to monitor more than $\gamma M_{PDCCH}^{max,\mu}$ PDCCH candidates and to perform channel estimation for more than $\gamma C_{PDCCH}^{max,\mu}$ CCEs in $N_{cells,1}^{DL,\mu}$ multi-TRP cells with numerology μ.
when $$\sum\nolimits_{\mu=0}^{3} \left( N_{cells,0}^{DL,\mu} + \gamma \cdot N_{cells,1}^{DL,\mu} \right) > N_{cells}^{cap},$$

the UE is not required to monitor more than $$\left\lfloor N_{cells}^{cap} \cdot M_{PDCCH}^{max,slot,\mu} \cdot \left( N_{cells,0}^{DL,\mu} + \gamma \cdot N_{cells,1}^{DL,\mu} \right) \middle/ \sum\nolimits_{j=0}^{3} \left( N_{cells,0}^{DL,j} + \gamma \cdot N_{cells,1}^{DL,j} \right) \right\rfloor$$

PDCCH candidates in $N_{cells,0}^{DL,\mu} + N_{cells,1}^{DL,\mu}$ cells and to perform channel estimation for more than $$\left\lfloor N_{cells}^{cap} \cdot C_{PDCCH}^{max,slot,\mu} \cdot \left( N_{cells,0}^{DL,\mu} + \gamma \cdot N_{cells,1}^{DL,\mu} \right) \middle/ \sum\nolimits_{j=0}^{3} \left( N_{cells,0}^{DL,j} + \gamma \cdot N_{cells,1}^{DL,j} \right) \right\rfloor$$

CCEs in $N_{cells,0}^{DL,\mu} + N_{cells,1}^{DL,\mu}$ cells.

In the case of overbooking, the aforementioned number of PDCCH candidates are monitored as follows:
  Common search space sets are monitored first.
  User-specific search space sets are then monitored and priority to a USS is given according to its search space ID—the lower the search space ID, the higher the priority.
  The total number of the search space sets (CSS and USS sets combined) monitored according to the above steps in case of overbooking of PDCCH candidates is less than or equal to the aforementioned UE capability [3].

Downlink Transmission Configuration Indication

As previously described, the PDCCH and the PDSCH carry the DL control information and DL data, respectively, to a UE [1-6].

Demodulation reference signals (DMRS) are embedded for the coherent demodulation of the PDCCH/PDSCH at the UE. The DMRS consists of a set of DMRS ports. The number of DMRS ports determines the number of transmission layers contained in a PDSCH. DMRS is used for channel estimation at the UE to coherently demodulate the PDSCH or PDCCH(s). In the case of PDCCH, one or more of them may be transmitted on a CORESET. Therefore, the DMRS for the coherent demodulation of the PDCCH(s) on the CORESET may be embedded across the PDCCH(s) transmitted on the CORESET.

A parameter in the transmission of the PDCCH and the PDSCH is the 'Transmission Configuration Indication'—state (TCI-state) [4]. In 3GPP Rel. 16, the indication of how the control or the shared channel is transmitted by the gNB and what assumptions the UE must consider while receiving them, is done via reference signals (RSs). The indication to the UE is performed using a TCI-state information element (IE) configured via RRC, as illustrated in FIG. 4. A TCI-state IE, among others, consists of the following elements:
  One of more reference signal(s), and
  for each reference signal, one or more quasi-colocation (QCL) assumptions.

The TCI-state is used to mention how to receive a PDSCH or the PDCCH(s) transmitted on a CORESET. Applying a TCI-state to a PDSCH or CORESET implies that the DMRS ports of the PDSCH or the DMRS ports of the PDCCH(s), transmitted on the CORESET, shall be assumed to be quasi-co-located with the reference signals mentioned in the TCI-state.

For any channel or signal, assuming 'quasi-colocation' with respect to a specific reference signal or resource or any other channel means that one or more of the following channel parameters may be derived from or assumed to be the same as that of said RS or resource or channel: Doppler shift, Doppler spread, average delay, delay spread, spatial Rx parameter. Depending on the set of parameters to be obtained or derived from the associated RS or resource or channel, a QCL type may be associated with said RS or resource or channel.

Assuming 'quasi-colocation' means that certain channel parameters such as Doppler shift/spread, delay spread, average delay and/or Tx beam direction are assumed to be the same for the RS mentioned in the TCI-state and the DMRS ports of the PDSCH, or the DMRS ports of the PDCCH(s) transmitted on the CORESET. Four different QCL types can be indicated in 3GPP Rel. 16 [4].
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

One or more of the QCL-Info parameter(s) is/are included in the TCI-state IE to provide the QCL assumption(s) associated with the TCI-state.

For example, a TCI-state IE comprising a DL reference signal (RS) 'A' with QCL assumption 'QCL-typeA' and a DL RS 'B' with QCL-assumption 'QCL-TypeD' is considered. Applying this TCI-state to a PDSCH or CORESET with the given quasi-colocation assumptions means that the UE may assume the same Doppler shift, Doppler spread, average delay and delay spread for the PDSCH or the PDCCH(s) transmitted on the CORESET and DL RS A, and the UE may use the same spatial filter to receive the DL RS 'B' and the PDSCH or the PDCCH(s) transmitted on the CORESET, or the Rx spatial filter to receive the PDCCH(s) on the CORESET or the PDSCH may be obtained from or be similar to that used for the reception of the DL RS 'B'.

Usually, the TCI state that is used to schedule a PDCCH or a PDSCH contains the identifiers (IDs) of channel state information reference signals (CSI-RS) or synchronization signal blocks (SSB) along with the QCL assumptions for the reference signal. The RS in the TCI-state is usually a RS that the UE has measured before, so that it can use it as a reference to receive the DMRS of the PDCCH or PDSCH, and hence demodulate the same. The indication of a TCI-state for a CORESET or a PDSCH is performed via MAC-CE messages or using the TCI-indication field in the downlink control information (DCI) used to schedule the PDSCH.

In FR2, where the gNB and UE establish a connection via spatially selective/directive beams, the TCI-state is used to indicate the Rx beams in which the UE may receive, i.e., the spatial filter that may be used by the UE to receive a PDSCH/PDCCH(s) via a 'qcl-TypeD' assumption with a CSI-RS or an SSB that the UE has received. The determination of the DL Tx beam to transmit PDCCH(s)/PDSCH is performed via a beam sweeping procedure by the network node (e.g., the gNB). In a beam sweeping procedure, the gNB configures a set of DL RSs (CSI-RS or SSB) via RRC for the UE to measure the set of DL RSs. Each of the configured DL RS may be transmitted with a different spatial filter, i.e., each of the configured DL RS may be transmitted in a different direction by the gNB. The UE measures each of the configured DL RS by receiving them using one or more spatial filters—the RSs may all be received with the same spatial filter or a different spatial filter may be used to receive each RS. Following the measurements, the UE sends a beam report to the gNB. The beam report comprises the indices of $1<L<4$ configured DL RSs (essentially, L DL Tx beam directions, with each beam direction resulting from the use of a specific spatial filter at the gNB) along with the received power in each of the RSs [4]. With the help of the beam report, the gNB determines one or more suitable DL Tx beam direction(s), i.e., spatial filter(s) for the transmission of the PDCCH(s) and the PDSCH.

3GPP DRAFT; R1-1908990 (2019-08-16) provides a discussion on multi-TRP and multi-panel.

3GPP DRAFT; R1-1902091 (2019-02-16) discusses enhancements on multi-TRP/panel transmission.

In the following, the improvement of reliability/robustness and the performance of PDCCH in 5G networks is discussed in accordance with the embodiments herein.

SUMMARY

It is an objective of the embodiments herein to provide methods and apparatuses for enhancing the reliability and the performance of PDCCH transmissions in 5G advanced networks.

According to an aspect of some embodiments herein, there is provided a method performed by a UE, the method comprising: receiving from a network node (or gNB), via a higher layer, a configuration of one or more search space sets which are associated with one or more control resource sets (CORESETs), for one or more PDCCH(s), wherein each search space set comprises a number of PDCCH candidates and each PDCCH candidate comprises or is made up of a number of resource elements, also called (CCEs), and the UE monitors for one or more DCIs of a specific format or formats as indicated via a higher layer in the configured PDCCH candidates; wherein a configuration or indication of an association of one or more said search space sets with a search space set pool is provided to the UE, wherein at least two PDCCH candidates from one or more search space sets in the search space set pool are associated with the same DCI content; or an association of two or more TCI states with a single CORESET is obtained from the network node via a PHY-layer indication, a MAC-CE message, or via a higher layer indication; and applying the configuration(s) or indication(s) of the association for receiving one or more PDCCH(s) on the search space sets. The configuration or indication that provides the association of one or more said search space sets with a search space set pool may be signaled to the UE via a higher layer from the network node (or gNB) or it is a priori known to the UE, for example, it is fixed in the specification.

It is also proposed that the PDCCH candidates may be a given slot, or in a given span in a cell, wherein a group g of PDCCH candidates comprises $p_g>1$ PDCCH candidates which are associated with the same DCI content. It is proposed that in this case a number of blind decoding attempts counted for group g in the given slot, or in the given span in the cell, may be performed wherein the number of blind decoding attempts is one of the following:

one blind decoding attempt, a number $s_g$ of blind decoding attempts, wherein $s_g$ is less or equal to the number of PDCCH candidates in said group g.

It is proposed that one of the following may be reported to the network node:

a number of monitored PDCCH candidates and/or a number of monitored CCEs and/or a number of blind decoding attempts with respect to a group of PDCCH candidates that are associated with the same DCI content;

an index or a parameter that indicates a number of monitored PDCCH candidates and/or a number of monitored CCEs and/or a number of blind decoding attempts with respect to a group of PDCCH candidates that are associated with the same DCI content.

Another proposed aspect of the invention teaches that if two or more search space sets are present in a search space set pool:

the i-th PDCCH candidates or the PDCCH candidates with index i with aggregation level L of the at least two search space sets in the search space set pool are associated with the same DCI content, or the PDCCH candidates from the at least two search space sets in the search space set pool with at least the same value for the index of the first CCE are associated with the same DCI content.

According to another aspect of the invention, it is proposed that a PUCCH resource for the uplink control information is determined from a DCI or DCI content associated with multiple PDCCH candidates, using at least one of the following values:

the value indicated in the PUCCH resource indicator (PRI) field in the DCI, and/or the number of CCEs from at least one CORESET associated with one or more of the PDCCH candidate(s), and/or the index of the first CCE from at least one of the PDCCH candidates.

According to another aspect of embodiments herein, there is provided a UE comprising a processor and a memory containing instructions executable by the processor, whereby said UE is operative or configured to perform any one of the embodiments presented in the detailed description related to the actions performed by the UE.

According to an aspect of some embodiments herein, there is provided a method performed by a network node or gNB, the method comprising: transmitting to a UE, via a higher layer, a configuration of one or more search space sets which are associated with one or more CORESETs, for one or more PDCCH(s), wherein each search space set comprises a number of PDCCH candidates and each PDCCH candidate comprises or is made up a number of CCEs, for enabling the UE to monitor one or more DCIs of a specific format or formats as indicated via a higher layer in the configured PDCCH candidates; wherein a configuration or an indication of an association of one or more said search space sets with a search space set pool is provided to the UE, wherein at least two PDCCH candidates from one or more search space sets in the search space set pool are associated with the same DCI content; or an association of two or more TCI states with a single CORESET is provided by the network node to the UE via a PHY-layer indication, a MAC-CE message, or via a higher layer indication. The configuration or indication that provides the association of one or more said search space sets with a search space set pool may be signaled to the UE via a higher layer from the network node (or gNB) or it is a priori known to the UE, for e.g., it is fixed in the specification. The search space set pool signaled via higher layer may be performed using a for example a higher layer configuration of the SS sets, a listing via a new higher layer information element (IE), MAC-CE signalling, etc. As another example, a higher layer signaling may be performed via RRC.

It is proposed that, if the PDCCH candidates are configured in a given slot, or in a given span in a cell, and if a group g of PDCCH candidates comprises $p_g>1$ PDCCH candidates which are associated with the same DCI content, then a number of blind decoding attempts counted for group g in the given slot, or in the given span in the cell, may have been performed, and the number of blind decoding attempts may be one of the following:
  one blind decoding attempt,
  a number $s_g$ of blind decoding attempts, wherein $s_g$ is less or equal to twice the number of PDCCH candidates in said group g.

In this case, it is proposed that one of the following is received from the UE:
  a number of monitored PDCCH candidates and/or a number of monitored CCEs and/or a number of blind decoding attempts with respect to a group of PDCCH candidates that are associated with the same DCI content;
  an index or a parameter that indicates a number of monitored PDCCH candidates and/or a number of monitored CCEs and/or a number of blind decoding attempts with respect to a group of PDCCH candidates that are associated with the same DCI content.

It is then proposed that if two or more search space sets are present in a search space set pool, then:
  the i-th PDCCH candidates or the PDCCH candidates with index i with aggregation level L of the at least two search space sets in the search space set pool are associated with the same DCI content, or
  the PDCCH candidates from the at least two search space sets in the search space set pool with at least the same value for the index of the first CCE are associated with the same DCI content.

According to another aspect of the invention, it is proposed that the method comprises receiving a PUCCH resource for the uplink control information determined from a DCI or DCI content associated with multiple PDCCH candidates, using at least one of the following values:
  the value indicated in the PUCCH resource indicator (PRI) field in the DCI, and/or
  the number of CCEs from at least one CORESET associated with one or more of the PDCCH candidate(s), and/or
  the index of the first CCE from at least one of the PDCCH candidates.

According to another aspect of embodiments herein, there is provided a network node comprising a processor and a memory containing instructions executable by the processor, whereby said network node is operative or is configured to perform any one of the embodiments presented in the detailed description related to the actions performed by the network node.

There is also provided a computer program comprising instructions which when executed on at least one processor of the UE, cause the at least said one processor to carry out the actions or method steps presented herein.

There is also provided a computer program comprising instructions which when executed on at least one processor of the network node, cause the at least said one processor to carry out the method steps presented herein.

A carrier is also provided containing the computer program, wherein the carrier is one of a computer readable storage medium; an electronic signal, optical signal or a radio signal.

An advantage of embodiments herein is to enhance the reliability, robustness and/or the performance of the PDCCH. Another advantage is to improve the reliability of the DCI decoding.

Additional advantages of the embodiments herein are provided in the detailed description of this disclosure.

BRIEF DESCRIPTION OF THE DRAWINGS

FIG. 1 depicts a higher layer configuration of a CORESET (state of the art (SoTA))

FIG. 2 illustrates a higher layer configuration of a search space set (SoTA)

FIG. 3 shows a master information block (MIB) provided to the UE via the RRC (SoTA)

FIG. 4 illustrates the RRC configuration of the TCI-state information element (SoTA)

FIG. 5 depicts a new higher layer configuration of a search space set comprising a search space set pool index according to some embodiments FIG. 6 illustrates a new higher layer configuration of a search spate set pool information element comprising a list of search space set IDs, according to an embodiment FIG. 7 depicts an example association of multiple PDCCH candidates from different search space sets in a search space set pool associated with the same DCI content, according to an exemplary embodiment

DETAILED DESCRIPTION

Figure 8:
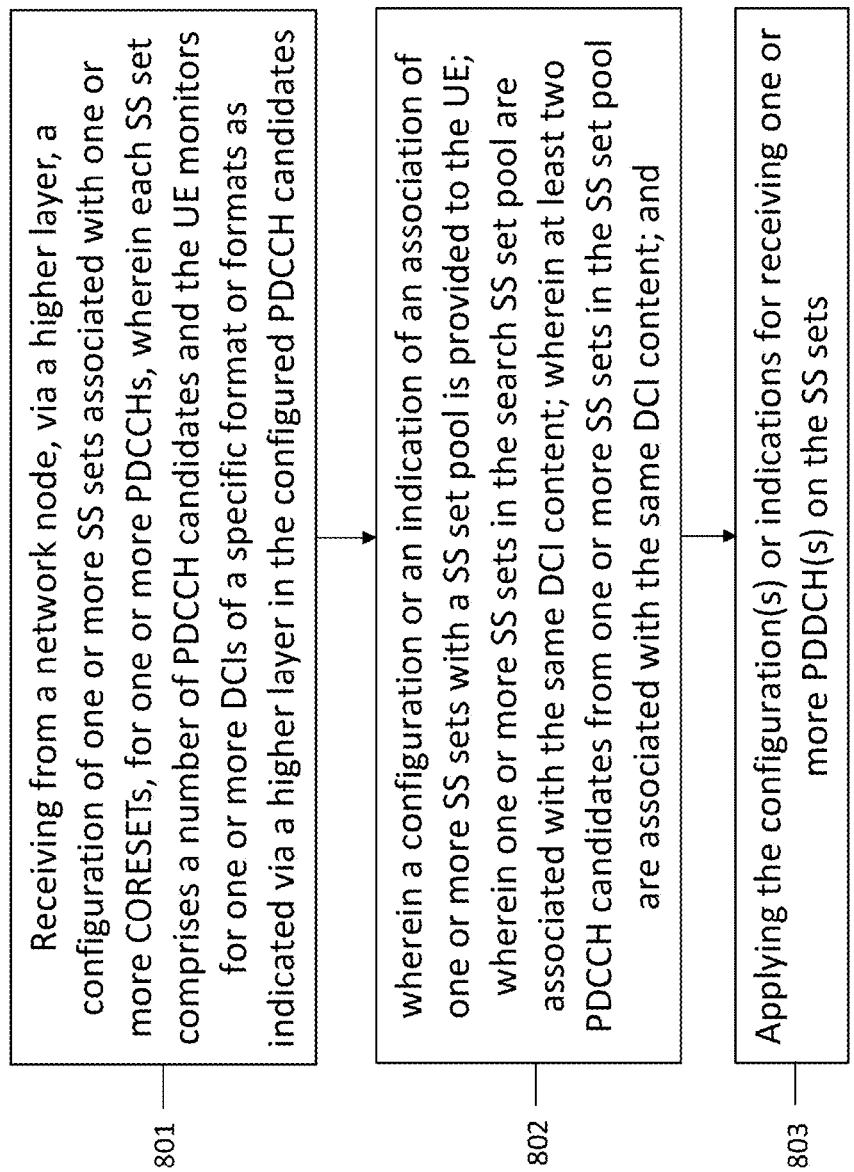
FIG. 8 illustrates a flowchart of a method performed by a UE according to some embodiments

In the following, a detailed description of the exemplary embodiments is described in conjunction with the drawings, in several scenarios to enable easier understanding of the solution(s) described herein.

As previously mentioned, there is provided methods and apparatuses in the form of a UE and a gNB respectively, for enhancing the reliability and/or robustness and performance of the PDCCH for a 5G based advanced network. In the following, a detailed description of the embodiments is presented for fully understanding the advantages provided by the present invention.

Association of Multiple Search Space Sets with a Search Space Set Pool

According to an embodiment, a method performed by the UE comprises: receiving, from a network node (or gNB) via a higher layer, a configuration or an indication of one or more search space sets which are associated with one or more CORESETs for one or more PDCCH(s), wherein each search space set comprises a number of PDCCH candidates and each PDCCH candidate comprises a number of resource elements, denoted control channel elements or CCEs; the UE monitoring for DCI(s) having specific format(s) as indicated via a higher layer in the configured PDCCH candidates, wherein a configuration or an indication of an association of one or more search space set(s) with a search space set pool is provided to the UE and wherein at least two PDCCH candidates from one or more search space sets in the search space set pool are associated with the same DCI content. The method further comprises, applying the configuration(s) or indication(s) for receiving one or more PDCCH(s) on the search space set(s).

The UE is thus provided with a configuration or indication that provides an association of one or more search space set(s) with a search space set pool. According to an embodiment, the UE is configured to receive the configuration or indication that provides an association of one or more search space sets with a search space set pool via a higher layer from the gNB or any other network node. According to another embodiment, the configuration that provides an association of one or more search space sets with a search space set pool is a priori known by the UE (e.g., it is fixed in the specification).

In the above method, the term 'monitoring' means that the UE searches for valid DCI(s) according to the DCI format(s) indicated via a higher layer during the decoding process to obtain the DCI(s) from the said PDCCH candidate(s).

The UE expects that at least two PDCCH candidates monitored by the UE on the one or more search space (SS) sets in the same search space set pool are associated with the same DCI content.

In an embodiment, there may be multiple sets or groups of PDCCH candidates wherein each set or group comprises PDCCH candidates from one or more search space sets in the search space set pool, wherein the PDCCHs transmitted on all the PDCCH candidates in the set or group are associated with the same DCI content. In another embodiment, there is only a single group containing all PDCCH candidates from one or more search space sets in the search space set pool, wherein the PDCCHs transmitted on all the PDCCH candidates in the group are associated with the same DCI content. This means that the UE may combine and/or process together multiple PDCCHs received on different PDCCH candidates when decoding the DCI to increase the reliability or any other performance metric of the PDCCH.

The higher layer indication or configuration that provides an association of one or more search space sets with a search space set pool may be realized by one of the following options:

Option 1: The higher layer configuration of a search space set comprises a new higher layer parameter, titled, for example, as: 'SearchSpaceSetPoolIndex' or 'SearchSpaceSetGroupIndex'. The parameter comprises a value that may be used as an identifier (ID) or an index or an indicator of a search space set pool. The search space sets associated with the same value for the parameter 'SearchSpaceSetPoolIndex' or 'SearchSpaceSetGroupIndex' may be considered to form a search space set pool.

FIG. 5 shows an example of the higher layer configuration of a search space set comprising the new higher layer parameter 'SearchSpaceSetPoolIndex'. It should be noted that the identifier for a search space set pool may be called a search space set pool index or search space set pool indicator or search space set pool identifier (ID).

Option 2: A new higher layer information element is defined that comprises a list of identifiers (IDs) or indices or indicators of search space sets that belong to the same search space set pool. FIG. 6 shows exemplary such a higher layer information element. The information element may comprise an index or indicator that identifies the search space set pool.

Option 3: A medium access control—control element (MAC-CE) message is provided to the UE that performs the association of multiple search space sets to a search space set pool. The MAC-CE message is obtained via the medium access control (MAC) layer. The MAC-CE message comprises one or more octets with a predetermined set of fields (e.g., fixed and known from the specification) for the UE. For example, the UE may receive the MAC-CE message from the gNB or any other network node for the indication of the search space set pool that comprises at least the following fields: a list of search space set IDs, and optionally a search space set pool index or indicator or identifier, ID.

It should be noted that the term 'DCI content' in this disclosure denotes the content of a single downlink control information of a certain format. In addition, the indication of PDCCH candidates associated with the same/single DCI content or PDCCH candidates associated with a DCI content, in this disclosure, may mean one of the following:

All the associated PDCCH candidates are associated with a single DCI of a particular format and a particular stream of bits.

Each PDCCH candidate may be associated with a DCI of a particular format, wherein all the DCIs have the same functionality, i.e., all the DCIs may schedule the same PDSCH, PUSCH, sidelink, provide the same slot format indication, transmit power control command(s) or availability of soft resources, etc. The information carried by each DCI can be in part different with respect to at least one other DCI. In one example, the TCI-state settings indicated by the DCI may be different for the DCIs that schedule the same PDSCH or PUSCH. In another example, the parameters associated with the time domain resource assignment (e.g., slot offset, symbol starting index and PDSCH/PUSCH length) in the DCIs for scheduling the PDSCH or PUSCH may be different. For instance, depending on the slot in which the DCI is transmitted, the slot offset value in the DCIs may be different.

The content of the DCI(s) is processed, modulated and mapped to one or more CCEs.

In this disclosure, the transmit-processing of a DCI denotes the performing of at least one of the following operations on the DCI content according to a certain format: zero padding, CRC attachment, encoding using an error control coding method, interleaving, rate-matching and modulation.

The phrase 'PDCCH candidate(s) associated with a DCI content', in this disclosure, may imply that the one or more CCEs of an associated PDCCH candidate may comprise either only a part of said transmit-processed DCI or the whole of said transmit-processed DCI.

It may be further noted that the term 'search space set pool' is used herein to indicate a pool of PDCCH candidates which are provided in one or more search space sets, wherein one or more groups of PDCCH candidate(s) from one or more search space sets may exist, and each group comprises one or more PDCCH candidates, and wherein the PDCCH candidate(s) in each group are associated with the same DCI content. The monitored symbol(s) or slot(s) of one of the search space sets associated with said PDCCH candidate(s) may be different from the symbol(s) or slot(s) of another search space set associated with said PDCCH candidate(s). For example, the PDCCH candidates associated with the same DCI content may be associated with the same slot or different slots, i.e., the PDCCH candidates can be multiplexed within a slot (intra-slot time-division multiplexed) or across slots (inter-slot time-division multiplexed). The term 'search space set pool' may be interchangeably used with other terms such as 'search space set group' or 'search space set association'.

In accordance with some embodiments, the UE is configured with an association of one or more search space sets with a search space set pool, wherein M≥1 sets of PDCCH candidates may exist, with the m-th set (m=1, 2, . . . , M) comprising $K_m>1$ PDCCH candidates that are monitored on $s_m \leq 1$ search space sets in the search space set pool, and wherein all the $K_m$ PDCCH candidates in the m-th set are associated with the same DCI content. The PDCCHs transmitted on the $K_m$ PDCCH candidates that are associated with the same DCI content can be combined or processed together by the UE to decode the DCI from multiple PDCCHs. An example of the association of a single DCI with multiple PDCCH candidates from a search space set pool is provided in FIG. 7. As shown, multiple PDCCH candidates (marked boxes) from a SS set pool (and possibly different aggregation levels (AL)) are associated with the same DCI content.

In accordance with an embodiment, the UE is configured to receive an indication of the above M≥1 sets of PDCCH candidates via a higher layer, wherein the PDCCH candidates of each set are associated with the same DCI content.

In accordance with another embodiment, the configuration of the above M≥1 sets of PDCCH candidates is known to the UE (e.g, it is fixed in specification), or it is determined and reported by the UE to the gNB or any other network node.

Two different methods are herein presented for the transmission of a DCI, by the network node, using multiple PDCCH candidates:
1) Transmission method 1: The DCI is transmit-processed, and the modulated symbols are mapped to a number of CCEs. The CCEs are mapped to a number of PDCCH candidates. This means each PDCCH candidate is associated with a part of the DCI. The CCEs comprising different parts of the DCI are collected by the UE from multiple PDCCH candidates associated with the DCI to decode the DCI.
2) Transmission method 2: A number of CCEs is associated with multiple DCIs and each DCI is mapped to the CCEs of a PDCCH candidate, wherein all DCIs are associated with the same content, i.e., all DCIs have the same format and stream of bits, or they all have the same functionality, while the format and/or stream of bits for at least one DCI can be different with respect to one other DCI. The transmit-processing of the DCIs may or may not be identical for the different PDCCH candidates. This transmission method, essentially, repeats the DCI content in each PDCCH candidate with identical or non-identical transmit processing. All PDCCH candidates are associated with the same DCI content, i.e., the DCI may be obtained by the UE by decoding the CCEs from at least one of said PDCCH candidates. The UE may select and decode one or more of the PDCCH candidates to obtain the DCI, or combine and/or perform joint processing of the CCEs obtained from two or more PDCCH candidates associated with the DCI to improve the reliability of the DCI decoding.

Transmission method 1 is hence a diversity-based PDCCH transmission scheme and the transmission method 2 is a reliability-based transmission scheme. Both schemes aim at improving the decoding performance of the PDCCH.

The following two different schemes of transmission may be possible resulting in different combining methods at the UE when the DCI content is repeated according to the second method above on multiple PDCCHs received by the UE:
  (i) Scheme 1: The PDCCH candidates of the search space sets in the search space set pool that are associated with the same DCI content may comprise the same numbers of control channel elements (CCEs), i.e., they are associated with the same aggregation level. The transmit-processing of the DCIs is identical or at least the length of the rate matched outputs is identical on all the received PDCCHs, i.e., the sets of bits provided after rate-matching to be mapped to each PDCCH candidate is identical by employing identical transmit-processing or at least an identical number of bits are available to be mapped to each PDCCH candidate as all the associated PDCCH candidates comprise identical number of CCEs. When the transmit-processing of the DCIs on all the received PDCCHs is identical, the UE may combine the received PDCCHs (after equalization) monitored on the PDCCH candidates associated with the same DCI content, and then decode the DCI based on the combined PDCCHs. In another case, the UE may perform joint processing and decoding of the received PDCCHs to decode the DCI. In a third case, the UE may select to process and decode one or more of the received PDCCHs to obtain the DCI. For e.g., the UE may attempt decoding the PDCCH candidates associated with the DCI one by one until the DCI is successfully decoded. In another example, the UE may choose one among the associated PDCCH candidates and attempt to decode it to obtain the DCI.
  (ii) Scheme 2: The PDCCH candidates of the search space sets in the search space set pool that are associated with the same DCI content may comprise different numbers of control channel elements (CCEs), i.e., they are associated with different aggregation levels. The transmit-processing of the DCIs on the received PDCCHs may then not be identical. The UE may jointly process the received PDCCHs monitored on the PDCCH candidates associated with the same DCI content during the decoding operation of the DCI. In another case, the UE may select to process and decode one or more of the received PDCCHs to obtain the DCI. For e.g., the UE may attempt decoding the PDCCH candidates associated with the DCI one by one until the DCI is successfully decoded. In another example, the UE may choose one among the associated PDCCH candidates and attempt to decode it to obtain the DCI.

In accordance with some embodiments, the UE is configured to receive an indication from the gNB or any other network node via a higher layer that indicates whether the PDCCHs received by the UE on PDCCH candidates in search space sets associated with the same search set pool that are associated with the same DCI content comprises a part of the transmit processed DCI in each PDCCH, or the PDCCHs received by the UE on PDCCH candidates in search space sets associated with the same search set pool are associated with the same DCI content, comprise the whole of the transmit-processed DCI content in each PDCCH. This means in the first method, the CCEs covering a single DCI are distributed over the PDCCH candidates, i.e., each PDCCH candidate comprises a part of the DCI. Therefore, the CCEs from more than one PDCCH are required to decode the DCI.

In the second method, a number of CCEs is associated with multiple DCIs, wherein all DCIs carry the same content. The CCEs are mapped to a number of PDCCH candidates, and each PDCCH candidate is associated with a DCI. The UE may selectively process one or more individual PDCCH candidate(s) or may combine and/or perform joint processing of multiple received PDCCHs to improve the decoding reliability. The PDCCH candidates in the second method may have identical or non-identical aggregation levels and the transmit processing of the DCI content before being mapped to the PDCCH candidates may be identical or non-identical.

The association of the first or second method with a search space set pool may be performed via a higher layer signaling or a MAC-CE message. The MAC-CE message, for example, may comprise at least the following fields: a search space set pool ID, and a field to indicate the transmission method. In another example, the method may be generally indicated for all configured search space set pools via a higher layer.

The indication of the PDCCH candidates of the different search space sets in the same pool that are associated with the same DCI content may be either configured by the gNB or any other network node, or the association of PDCCH candidates from the different search space sets in the pool with the same DCI content may be provided in the specifications (i.e., it is a priori known to the UE).

Examples for the association of the PDCCH candidates in a search space set pool are provided in the following.
Association of PDCCH Candidates in the Search Space Set Pool with Identical Aggregation Level A first method for the association of PDCCH candidates from one or more search space sets in the search space set pool is based on the aggregation level of the PDCCH(s). When transmitting the same DCI content via multiple PDCCHs such as in scheme 1 of transmission method 2, for example, the aggregation level of all the PDCCHs may be identical.

In accordance with an embodiment, the UE is configured with an association of one or more search space sets with a search space set pool, wherein M≥1 sets of PDCCH candidates may exist, with the m-th set (m=1, 2, . . . , M) comprising $K_m$>1 PDCCH candidates that are monitored on $S_m$>1 search space sets in the search space set pool, and wherein all the $K_m$ PDCCH candidates in the m-th set are associated with the same aggregation level and with the same DCI content.

Depending on the transmission method used, the UE may perform appropriate processing (e.g., combining, joint processing or collective decoding of the CCEs) of the PDCCHs received on said PDCCH candidates to achieve a higher reliability or to improve any other performance metric of the PDCCH transmission.

An example association using this method would be as follows: the i-th PDCCH candidates of aggregation level L (if this aggregation level is configured) of the at least two search space sets in the search space set pool are associated with the same DCI content. The correspondence among the PDCCH candidates in search space sets in the same pool may apply only when for a PDCCH candidate in one search space set a corresponding PDCCH candidate exists in another search space set. The PDCCH candidates that correspond to each other are associated with the same DCI content.

Note: The value i, when stating 'i-th PDCCH candidate' may also be considered as the index of the PDCCH candidate. There may be two different methods of indexing the PDCCH candidates. The index i may be associated with a specific aggregation level in a search space set, i.e., the ordering of the PDCCH candidates with respect to an index may be performed for a given aggregation level in a search space set. For e.g., consider a SS set comprising 4 PDCCH candidates with aggregation level $L_1$ and 4 PDCCH candidates with aggregation level $L_2$. To uniquely identify a PDCCH candidate in the search space set, the index of the PDCCH candidate, say $i_1$ and its aggregation level must be mentioned to identify it in the search space set. If just the PDCCH candidate index is given, say $i_1$=1, it may denote the $1^{st}$ PDCCH candidate of aggregation level $L_1$ or $L_2$. Therefore, identifying a PDCCH candidate requires the indication of the aggregation level as well. In another method of indexing, all the PDCCH candidates in the SS set may be collectively indexed. For e.g., consider a SS set with 4 PDCCH candidates with aggregation level $L_1$ and 4 PDCCH candidates with aggregation level $L_2$. Indices 1-4 may denote the four PDCCH candidates with aggregation level $L_1$ and indices 5-8 may denote the four PDCCH candidates with aggregation level $L_2$. It should also be noted that in either of the indexing methods, the indexing can also start from 0 instead of 1.

As an example, consider two search space sets $s_i$ and $s_j$ which are associated with the same search space set pool. Let the search space set $s_i$ comprise two PDCCH candidates of aggregation level 2 and two PDCCH candidates of aggregation level 4. Furthermore, let the search space set $s_j$ comprise four PDCCH candidates of aggregation level 2 and four PDCCH candidates of aggregation level 4. The following pairs of PDCCH candidates are associated with the same DCI content according to this example:

The $1^{st}$ PDCCH candidate in search space set $s_i$ of aggregation level 2 and the $1^{st}$ PDCCH candidate in search space set $s_j$ with aggregation level 2.

The $2^{nd}$ PDCCH candidate in search space set $s_i$ with aggregation level 2 and the $2^{nd}$ PDCCH candidate in search space set $s_j$ with aggregation level 2.

The $1^{st}$ PDCCH candidate in search space set $s_i$ with aggregation level 4 and the $1^{st}$ PDCCH candidate in search space set $s_j$ with aggregation level 4.

The 2$^{nd}$ PDCCH candidate in search space set s$_i$ with aggregation level 4 and the 2$^{nd}$ PDCCH candidate in search space set s$_j$ with aggregation level 4.

The remaining PDCCH candidates in search space set s$_1$ (i.e., the two PDCCH candidates left out for aggregation levels 2 and 4) do not have corresponding PDCCH candidates in search space set s$_i$. This association among the PDCCH candidates with the same DCI content is either configured or indicated via a higher layer, or explicitly known by specification.

Note that the correspondence between the PDCCH candidates among search space sets in the same pool only applies when for a PDCCH candidate in one search space set a corresponding PDCCH candidate exists in another search space set.

In another example, consider two search space sets s$_i$ and s$_j$ which are associated with the same search space set pool. Let the search space set s$_i$ be configured with two PDCCH candidates each with aggregation level 1, 2 and 4, and let the search space set s$_j$ be configured with four PDCCH candidates each with aggregation level 2 and 4. The following pairs of PDCCH candidates are associated with the same DCI content in this example:

The 1$^{st}$ PDCCH candidate in search space set s$_i$ of aggregation level 2 and the 1$^{st}$ PDCCH candidate in search space set s$_1$ of aggregation level 2.

The 2$^{nd}$ PDCCH candidate in search space set s$_i$ of aggregation level 2 and the 2$^{nd}$ PDCCH candidate in search space set s$_i$ of aggregation level 2.

The 1$^{st}$ PDCCH candidate in search space set s$_i$ of aggregation level 4 and the 1$^{st}$ PDCCH candidate in search space set s$_1$ of aggregation level 4.

The 2$^{nd}$ PDCCH candidate in search space set s$_i$ of aggregation level 4 and the 2$^{nd}$ PDCCH candidate in search space set s$_1$ of aggregation level 4.

The remaining PDCCH candidates in search space set s$_1$ (the two PDCCH candidates each left out for aggregation level values 2 and 4, i.e., the 3$^{rd}$ and 4$^{th}$ PDCCH candidates for the aggregation levels 2 and 4) and in the search space set s$_i$ (the two PDCCH candidates of aggregation level value 1) do not have corresponding PDCCH candidates in the other search space set. This association among the PDCCH candidates with the same DCI content is either configured or indicated via a higher layer, or is explicitly known by specification.

If the same number of PDCCH candidates is provided for an aggregation level L in each of the search space set in the search space set pool, then there may be a full correspondence between PDCCH candidates in the search space sets in the same pool.

In yet another example, all the search space sets in the pool are configured with an identical set of aggregation levels and an identical number of PDCCH candidates is provided for each aggregation value. In this case, for any given PDCCH candidate in the search space set in the pool there is a corresponding PDCCH candidate in all other search space sets in the pool which is associated with the same DCI content.

Association of PDCCH Candidates in Search Space Sets with Different Aggregation Levels In case of multi-TRP transmission, when the quality of the link between the UE and the TRPs is highly variable, different code rates may be required for the PDCCH transmission from each TRP. Therefore, the number of CCEs of the PDCCHs from the different TRPs (the aggregation level) may vary. In such a case, an association among PDCCH candidates of different aggregation levels of the search space sets in the same pool may be used as described in the following.

In accordance with an embodiment, an ordering of the aggregation levels is performed in each search space set in the search space set pool, either in ascending or descending order, wherein the i-th PDCCH candidates of the l-th ordered aggregation level of two or more search space sets in the search space set pool are associated with the same DCI content. Note again that the correspondence between the PDCCH candidates among search space sets in the pool with the same DCI content may apply only when for a PDCCH candidate in one search space set a corresponding PDCCH candidate exists in another search space set. This method may be applied for both transmission methods 1 and 2 previously described.

For example, consider two search space sets s$_i$ and s$_j$ associated with the same search space set pool. Let the search space set s$_i$ be configured with two PDCCH candidates each with aggregation level 1, 2 and 4, and let the search space set s$_j$ be configured with four PDCCH candidates each with aggregation level 2 and 4. The aggregation levels may be ordered in ascending order in all search space sets. Then, according to the above embodiment, the PDCCH candidates of aggregation level 1 in set s$_i$ and the PDCCH candidates of aggregation level 2 in set s$_1$ may be associated with the same DCI content. Similarly, the PDCCH candidates of aggregation level 2 in set s$_i$ and the PDCCH candidates of aggregation level 4 in set s$_1$ are associated with the same DCI content. The following pairs of PDCCH candidates, specifically, may be combined or processed together to obtain the associated common DCI content:

The 1$^{st}$ PDCCH candidate in search space set s$_i$ of aggregation level 1 and the 1$^{st}$ PDCCH candidate in search space set s$_i$ of aggregation level 2

2$^{nd}$ PDCCH candidate in search space set s$_i$ with aggregation level 1 and the 2$^{nd}$ PDCCH candidate in search space set s$_1$ with aggregation level 2

1$^{st}$ PDCCH candidate in search space set s$_i$ with aggregation level 2 and the 1$^{st}$ PDCCH candidate in search space set s$_1$ with aggregation level 4

2$^{nd}$ PDCCH candidate in search space set s$_i$ with aggregation level 2 and the 2$^{nd}$ PDCCH candidate in search space set s$_1$ with aggregation level 4

The remaining PDCCH candidates in search space set s$_1$ (the two PDCCH candidates each left out for aggregation level values 2 and 4—the 3$^{rd}$ and 4$^{th}$ PDCCH candidates for the aggregation values 2 and 4) and s$_i$ (the two PDCCH candidates with aggregation level value 4) do not have corresponding PDCCH candidates in search space set s$_j$.

In multi-TRP scenarios, the search space sets may be associated with different CORESETs, wherein each CORESET is configured with a different CORESETpoolIndex value. The above configuration of a search space set pool configuration may then be extended to the case of multi-TRP transmission to facilitate multi-TRP PDCCH transmissions of the same DCI content.

In accordance with an embodiment, the UE is configured to receive a higher layer indication or configuration that provides an association of one or more search space sets with a search space set pool wherein each search space set is associated with a CORESET and each CORESET is associated with a CORESETpoolIndex and wherein at least two CORESETs associated with two different search space sets in the search space set pool are configured with different values of the parameter CORESETpoolIndex. When CORESETs associated with the search space sets in a search space set pool are configured with different CORESETpoolIndex values, the search space set(s) associated with the CORESETs can be associated with different TRPs. This approach facilitates multi-TRP-based PDCCH transmissions that increase the reliability or diversity of the DCI.

Methods for the Association of PDCCH Candidates from Two or More Search Space Sets The following embodiment provides methods for the association of the PDCCH candidates.

In accordance with an embodiment, the UE is configured with an association of two or more search space sets $S_m$ with the same search space set pool, wherein M≥1 sets of PDCCH candidates may be present, with the m-th set (m=1, 2, . . . , M) comprising $K_m$>1 PDCCH candidates that are monitored by the UE on the $S_m$>1 search space sets, and wherein all the $K_m$ PDCCH candidates in the m-th set are associated with the same DCI or DCI content. The association of the PDCCH candidates from the different search space sets may be fixed in the NR specifications or indicated to the UE by the gNB or any other network node. The association of the PDCCH candidates may be performed based on at least one of the following:

the PDCCH candidates from the different SS sets that are associated may have the same PDCCH candidate index in the respective search space sets they belong to, and/or the PDCCH candidates from the different SS sets that are associated may have the same index for the first CCE of the PDCCH candidate, and/or the PDCCH candidate from the different SS sets that are associated may be explicitly indicated via a higher layer configuration or indication to the UE.

An example of the association of PDCCH candidates using the PDCCH candidate index is as follows: consider two search space sets $s_a$ and $s_b$ which are associated with the same search space set pool. Let the search space set $s_a$ comprise a total of $n_a$ PDCCH candidates in all aggregation levels and the search space set $s_b$ comprise a total of $n_b$ PDCCH candidates in all aggregation levels, wherein $n_a$ may or may not be equal to $n_b$. Then, the PDCCH candidate with index i or the i-th PDCCH candidate in the search space set $s_a$ is associated with the same PDCCH candidate index i or the i-th PDCCH candidate in search space set $s_b$. If a PDCCH candidate with index i or an i-th PDCCH candidate is not present in one of the search space sets, e.g., the value of i exceeds the PDCCH candidate index in the search space set $s_a$, then there may not be an associated PDCCH candidate in the search space set $s_b$. The associated PDCCH candidates may or may not have the same aggregation level.

An example of the association of PDCCH candidates using the index of the first CCE of the PDCCH candidates is as follows: consider two search space sets $s_a$ and $s_b$ which are associated with the same search space set pool. The search space set $s_a$ comprises two PDCCH candidates. The search space set $s_b$ comprises also two PDCCH candidates. For instance, the index of the first CCE for the two PDCCH candidates in SS set $s_a$ are 2 and 3, and the index of the first CCE for the two PDCCH candidates in SS set $s_b$ are 3 and 2. Then, the first PDCCH candidate of SSE set $s_a$ is associated with the second PDCCH candidate of SS set $s_b$ and the second PDCCH candidate of SS set $s_a$ is associated with the first PDCCH candidate of SS set $s_b$. Here again, the associated PDCCH candidates may or may not have the same aggregation level.

In accordance with embodiments, the UE is configured to receive an association between two or more different search space sets, wherein at least two PDCCH candidates from at least two search space sets may be associated via a higher layer configuration or indication in one of the following ways:

A higher layer information element, configuration or indication (for e.g., RRC or MAC) that comprises at least the indices of at least one set of PDCCH candidates from the two SS sets that are associated or linked with each other A higher layer information element, configuration, or indication (for e.g., RRC or MAC) that provides an indication for a specific association scheme between the PDCCH candidates among the SS sets. In some examples, there are two schemes, wherein when the first scheme is indicated, then the PDCCH candidates with the same PDCCH candidate index in the different SS sets are associated or linked with each other, and when the second scheme is indicated then the PDCCH candidates, in the different SS sets, with the same index of the first CCE are associated or linked with each other.

For all the methods described in this disclosure, the association of PDCCH candidates with the same DCI content may mean that the transmission of multiple PDCCHs is performed in the same set of symbols or at least within a certain restricted set of symbols. The reason for such a restriction, for example, may be that a DCI may be intended for the scheduling of a PDSCH or PUSCH. The DCI has to be decoded before the PUSCH transmission or the PDSCH reception, and hence all the PDCCH candidates associated with the DCI should be received at the same time or at least within a specific time duration to complete the decoding of the DCI and carry out the instructions in the DCI. Similarly, the PDCCH candidates of the search space sets belonging to the same search space set pool need to be monitored with the same periodicity and offset as they comprise shared control information. Therefore, some parameters including the aforementioned ones may have to be shared between the search space sets in a search space set pool so that the same DCI(s) can be transmitted on said search space sets.

In accordance with an embodiment, the UE is configured to receive, from the network node, a higher layer indication or configuration that provides an association of one or more search space sets with a search space set pool wherein the value of at least one of the following parameters configured for a search space set in said pool is identical to the corresponding parameter configured for another search space set within said search space set pool: search space type, DCI format(s) to be monitored, monitoring slot periodicity and offset, search space duration and the downlink bandwidth where the frequency domain resources of the associated CORESET are configured.

Association of Search Space Set(s) and CORESET(s) with TCI-State(s)

The association of one or more search space set(s) with a search space set pool as described above may help to improve the reliability with which the PDCCH(s) on the search space(s) are received by the UE. An extension of the feature would be to associate one or more search space set(s) or CORESET(s) with different TCI-state(s). This may mean that the PDCCH(s) received on the search space set(s) or CORESET(s) may be transmitted with various beam(s) or from various TRP(s) or transmit panel(s) associated with one or more network node(s). The multiple receptions of the PDCCH(s) provide an increased reliability when decoding the PDCCH(s). This may be performed in multiple ways.

In accordance with an embodiment, the UE is configured to receive an association of one or more TCI-state(s) with one or more search space set pool(s). The UE may be configured to receive the indication of the association via a PHY-layer indication, a MAC-CE message (i.e., MAC-CE layer indication), or via a higher layer. In another alternative, the association may be fixed and provided in the 3GPP NR specifications. After the UE has obtained the association of one or more TCI-state(s) with a search space set pool, the UE may apply the QCL assumption(s) provided in the TCI-state(s) during one or more monitoring occasions for the reception of the PDCCH(s) on the search space set(s) associated with the search space set pool. In a special case, the UE may apply the QCL assumptions provided in the associated TCI-state(s), one after the other during a series of one or more monitoring occasions for the search space set pool, for the reception of at least one PDCCH on said search space set pool. For example, if a search space set pool is associated with 2 TCI-states, the UE may apply a first TCI-state for the reception of at least one PDCCH on said search space set pool during a first monitoring occasion and a second TCI-state for the reception of at least one PDCCH on said search space set pool during a second monitoring occasion. In addition, the mapping of the TCI-states associated with a CORESET to a monitoring occasion may be performed via a higher layer configuration configured to the UE by a network node, or it is known to the UE, i.e., it is predetermined via a 3GPP specification. For example, if a CORESET is associated with TCI-states $T_i$ and $T_j$, the higher layer configuration may indicate that TCI-state $T_i$ is to be applied to the odd monitoring occasion(s) and TCI-state $T_j$ is to be applied to the odd monitoring occasion(s) or even monitoring occasions(s). In another example, if a CORESET is associated with TCI-states $T_1, \ldots, T_n$, where n>1, the higher layer configuration may indicate to the UE that during monitoring occasions M=$\{m_1, \ldots, m_p\}$, where p≥1, the TCI-state $T_i$, i∈$\{1, 2, \ldots, n\}$ is to be applied to the monitoring occasion(s) $M_i \subseteq M$, wherein for a set of monitoring occasions applied with TCI-state $T_i$, $M_i \subseteq M$ and a set of monitoring occasions applied with TCI-state $T_j$, $M_j \subseteq M$ for any i, j=1, . . . , n and i≠j, $M_i \neq M$, i.e., $M_i$ and $M_j$ are not equal sets.

In accordance with an embodiment, the UE is configured to receive an association of one or more TCI-state(s) with one or more CORESET(s). The UE may be configured to receive the indication of the association via a PHY-layer indication, a MAC-CE message message (i.e., MAC-CE layer indication), or via a higher layer indication. In another alternative, the association may be fixed and provided in the 3GPP NR specifications. After the UE has obtained the one or more TCI-state(s) associated with a CORESET, the UE may apply the QCL assumption(s) provided in at least one of the TCI-state(s) during one or more monitoring occasions for the reception of at least one PDCCH on one or more search space set(s) associated with the CORESET. In a special case, the UE may apply the QCL assumptions provided in the associated TCI-state(s), one after the other, for the reception of at least one PDCCH on said CORESET during a series of one or more monitoring occasion(s). For example, if a CORESET is associated with 2 TCI-states, the UE may apply a first TCI-state for the reception of at least one PDCCH on at least one search space set in the CORESET during a first monitoring occasion and a second TCI-state for the reception of at least one PDCCH on at least one search space set (the search space set(s) being the same or different from the ones during the first monitoring occasion) during a second monitoring occasion. In another case, the UE may obtain an association of two or more TCI-state(s) with a single CORESET, wherein the UE may apply the QCL assumption(s) provided in at least one of the TCI-state(s) for the reception of at least one PDCCH on at least one search space set in the CORESET during one or more monitoring occasions. An instance for this case would be as follows: if a CORESET is associated with 2 TCI-states, the UE may apply a first TCI-state for the reception of one or more PDCCH(s) on a first group of search space sets during one or more monitoring occasions and apply a second TCI-state for the reception of one or more PDCCH(s) on a second group of search search space sets during one or more monitoring occasions. Each group of said search space set(s) may comprise one or more search space set(s) and the groups themselves may have search space set(s) in common or may be disjoint. In a third case, the UE may obtain an association of two or more TCI-state(s) with a single CORESET, wherein the UE may apply the QCL assumption(s) provided in all the TCI-state(s) for the reception of at least one PDCCH on at least one of the search space set(s) in the CORESET in at least one monitoring occasion.

In an extension of the above method, the search space set(s) in the CORESET(s) may be associated with one or more search space set pool(s) as described in the previous methods. After the UE has obtained the one or more TCI-state(s) associated with a CORESET, it applies the QCL assumption(s) provided in the TCI-state(s) during one or more monitoring occasions for the one or more search space set(s) in one or more search space set pool(s) associated with the CORESET. In a version of the method, the UE may receive two or more TCI-state(s) for a CORESET. In that case, the UE may apply the QCL assumptions in a first TCI-state to one or more search space set(s) in at least one search space set pool associated with the CORESET, and the QCL assumptions in a second TCI-state to one or more search space set(s) in at least one other search space set pool associated with the CORESET.

In another extension of the above method, after the UE has obtained the one or more TCI-state(s) associated with a CORESET, the UE may apply the QCL assumptions in the TCI-state(s) to one or more search space set(s) in said CORESET, during one or more monitoring occasions. In a version of the method, if, during a monitoring occasion in slot n, a CORESET comprises $s_n$≥1 search space set(s) to be monitored and there are $t_n$>1 TCI-states associated with the CORESET, the UE may perform one of the following actions:

the UE applies the QCL assumptions from $s_m \leq s_n$ TCI-states to $s_n$ search space sets after a certain ordering of the TCI-states and/or mapping between the TCI-states and the search space sets for the reception of at least one PDCCH in the $s_n$ search space sets in the CORESET, or the UE applies the QCL assumptions from $t_m \leq t_n$ TCI-states to $s_n$ search space sets after a certain ordering of the TCI-states and/or mapping between the TCI-states and the search space sets for the reception of at least one PDCCH in the $s_n$ search space sets in the CORESET.

The variables $s_n$, $t_n$, $s_m$, $t_m$ may take any suitable values. It is to be noted that a search space set may be mapped to two or more different TCI-states and a single TCI-state may be mapped to two or more different search space sets.

The above methods pave way for PDCCH reliability enhancement in two ways:
1) Transmission of PDCCH(s) via multiple TRP(s) or panel(s) or beam(s) in the DL.
2) Transmission of PDCCH(s) on multiple search spaces or PDCCH candidates for control information.

Repetition or transmission of multiple versions of PDCCH(s) using the above ways increases the frequency, time, and spatial diversity of the received PDCCH(s), thereby improving the signal to noise ratio during the decoding of the PDCCH(s).

Dynamic Indication or Switching of Associations Among PDCCH Candidates or Search Space Sets In the methods described above the association of search space sets or two or more PDCCH candidates that are associated with one or more search space sets is discussed. The following embodiments discuss the dynamic switching between diversity-based or reliability-based PDCCH transmissions and legacy or non-reliability-based PDCCH transmissions. For example, it may be beneficial to support dynamic switching between multi-TRP based PDCCH transmission and single-TRP based PDCCH transmission in scenarios where it is required that the UE is served with different types of traffic (e.g., low-latency versus high data rate traffic). Different signaling methods for the dynamic switching are proposed in the following embodiments.

In accordance with an embodiment, the UE is configured to receive via the physical layer or via a higher layer, an indication regarding at least one of the following:

The activation or formation of the association between at least one PDCCH candidate in a search space set and at least one other PDCCH candidate in the same search space set or a different search space set associated with the same or a different CORESET.

The deactivation or termination of the association between at least one PDCCH candidate in a search space set and at least one other PDCCH candidate in the same search space set or a different search space set associated with the same or a different CORESET.

The association of the PDCCH candidates mentioned may very well be a search space set pool described in this disclosure. The signaling of the activation or the formation/indication of the association of PDCCH candidate(s) from one or more search space set(s) and the signaling of the deactivation/termination of the same determine the mode of operation for the PDCCH transmissions. The signaling may also be used to modify the association of the PDCCH candidates within a search space set.

There may be multiple different ways to achieve the above functionality.

In accordance with an embodiment, the UE is configured to receive a MAC-CE message which activates a search space set pool comprising one or more search space set(s). The message comprises at least the identifiers of one or more search space sets, and optionally the identifier of the search space set pool. The activation of a search space set pool essentially means that one or more groups of PDCCH candidates may be present among the PDCCH candidates in the indicated search space sets, where two or more PDCCH candidates exist in a given group. The PDCCH candidates in a given group may be from one or more of the indicated search space sets and the PDCCH candidates in a set are associated with the same DCI content.

After the reception of the MAC-CE in the above method, the UE may perform decoding of the DCI from the PDCCH candidates with the assumption that there may be more than one PDCCH candidate associated with the same DCI content. To enable the UE to perform independent decoding of each PDCCH candidate, i.e., to remove the assumption of two or more PDCCH candidates from the indicated search space set(s) associated with a single DCI content, the network or network node may signal to the UE a deactivation command. The removal of the assumption regarding the PDCCH candidates or the removal of the association among the PDCCH candidates in the indicated search space set(s) is termed as the deactivation or the termination of the search space set pool.

In accordance with an embodiment, the UE is configured to receive a MAC-CE message that activates/indicates or deactivates/terminates a search space set pool, wherein the MAC-CE message comprises at least the identifiers of one or more search space sets, an x-bit field that indicates the activation/indication or the deactivation/termination of the search space set pool, and optionally, the identifier of the search space set pool. After the reception of the MAC-CE with the x-bit field set to a value of $b_0$, the UE may consider that as an activation or indication of a search space set pool and if the MAC-CE is received with the x-bit field set to a value of $b_1$, the said search space set pool may be deactivated or terminated by the UE.

In accordance with an embodiment, the UE is configured to receive a MAC-CE message that activates/indicates or deactivates/terminates a search space set pool. The MAC-CE message may comprise different sets of fields when it is activating/indicating a search space set pool and when it is deactivating/terminating a search space set pool. In a first example, when activating or indicating a search space set pool, the MAC-CE message may at least comprise the identifiers of one or more search space set(s), and optionally the identifier of the search space set pool. When deactivating or terminating the search space set pool, the MAC-CE message may at least comprise the identifier of the search space set pool without the indication of the identifier(s) of any search space set(s). In a second example, when activating or indicating a search space set pool, the MAC-CE message may at least comprise the identifiers of one or more search space set(s), an x-bit field that indicates the activation/indication or the deactivation/termination of the search space set pool, and optionally, the identifier of the search space set pool. When deactivating or terminating the search space set pool, the MAC-CE message may at least comprise the identifier of the search space set pool and the x-bit field that indicates the activation/indication or the deactivation/termination of the search space set pool. For activation, the x-bit field may be set to a value of $b_0$ which indicates that the MAC-CE message comprises further field(s) that indicates one or more search space set(s) to indicate or activate a search space set pool. For deactivation, the x-bit field may be set to a value of $b_1$, which indicates that the MAC-CE message is signaled to deactivate the search space set pool with the given identifier.

In accordance with an embodiment, the UE is configured to receive via RRC or a higher layer, an association of one or more search space set(s) with a search space set pool. By signaling via lower layers (MAC-CE or PHY-layer for example), the search space set(s) associated with the search space set pool may be modified or the search set pool may be activated/indicated or terminated/deactivated. This method allows for just an activation or deactivation signaling without the signaling of the pooling/grouping of the search space set(s) via lower layer(s). For example, the UE may receive a higher layer information element (IE) indicating a search space set pool that comprises at least the following: the identifiers of one or more search space sets. It may also optionally comprise an identifier for the search space set pool or group or association. The UE may receive indication(s) via the RRC or another layer (MAC-CE message or PDCCH indication for example) that activates or deactivates/terminates said search space set pool. It may also receive indication via RRC or any other layer (MAC-CE message or PDCCH indication for example) regarding the inclusion or removal or modification of the search space set(s) in the search space set pool. In this way, the tasks of initial grouping of the search space set pool and the activation or deactivation or dynamic modification of the same may be separated.

Association of a Search Space Set with Multiple CORESETs

In accordance with an embodiment, a UE is configured to receive a configuration of a search space set via a higher layer wherein the search space set is associated with more than one CORESET in a serving cell. The UE may be provided with a configuration or indication of an association of a search space set with one or more CORESETs. The PDCCH(s) associated with said search space set is/are transmitted on one or more CORESET(s) associated with the search space set. That means, the CCEs corresponding to a PDCCH candidate in the search space set may be mapped to one or more of the associated CORESETs. The method may further comprise, applying the configuration(s) or indication(s) for receiving one or more PDCCH(s) on the search space set.

The UE may be provided with a configuration or indication of an association of a search space set with one or more CORESETs in the above method. According to an embodiment, the UE is configured to receive the configuration or indication that provides an association of a search space set with one or more CORESETs via a higher layer from the gNB or any other network node. According to another embodiment, the configuration that provides an association of a search space set with one or more CORESETs is a priori known by the UE (e.g., it is fixed in the specification).

The association of a search space set with one or more CORESETs may be performed via higher layer signaling in multiple ways or options, some of which are provided below:

Option 1: The UE may receive a MAC-CE message to associate a search space set with one of more CORESETs that comprises at least the following fields: a search space ID, the ID(s) or one or more CORESETs.

Option 2: The UE may receive a higher layer information element (IE) that comprises the ID of the search space set and the ID(s) of the CORESET(s) associated with the search space.

Option 3: The higher layer configuration of the search space set may indicate one or more CORESET ID(s) in the parameter 'ControlResourceSetId', to associate the search space with one or more CORESET(s).

The UE may hence combine or jointly process the PDCCH(s) from the search space set received on one or more CORESETs to improve the reliability or the performance of the decoding of the PDCCH(s), when a search space set is associated with multiple CORESETs.

There may be different ways to map the CCEs of the PDCCH candidates in the search space set to the associated CORESET(s) when a search space set is configured with multiple CORESETs as described above.

In accordance with some embodiments, the mapping of the PDCCH candidates to the CORESET(s) associated with the search space set is either configured or indicated to the UE via a higher layer by the gNB or any other network node or it is fixed in the specification. The UE may use said indication or specification directive to identify the CCEs for each PDCCH candidate on the associated CORESET(s).

For example, one of the following methods may be used for the mapping of the CCEs on to the associated CORESET(s):

Method 1: For any PDCCH candidate configured with L CCEs (aggregation level L) in the search space set, each CORESET that the search space set is associated with comprises L CCEs corresponding to the PDCCH candidate. In this case, the hash function described in [3] may be used with each and every CORESET to determine the CCE mapping for the PDCCH candidates in the search space to each associated CORESET. For example, if a search space set s is associated with two CORESETs $c_i$ and $c_j$, the hash function is first used with the CORESET $c_i$ to map all the PDCCH candidates in s to the CCEs on CORESET $c_i$. Then the hash function is used with the CORESET $c_j$ to map all the PDCCH candidates in s to the CCEs on CORESET $c_1$.

Method 2: For any PDCCH candidate configured with L CCEs (aggregation level L) in the search space set that is associated with P CORESETs, wherein the p-th CORESET that the search space set is associated with comprises $L_P$ CCEs of the PDCCH, wherein $L= L_1+ \ldots +L_p+ \ldots L_p$ where $0 \leq L_i \leq L$, p=1, ... P. The CCEs of a PDCCH candidate, in this method, are essentially split and mapped to the various CORESETs associated with the search space.

Along with the mapping method, additional parameters required to determine the mapping may also be provided via higher layer signaling or fixed in the specification—for example, in the case of the second method, the split of the CCEs of the PDCCH candidates among the CORESET(s) may be provided.

The transmission methods (transmission method 1 and transmission method 2) previously described for diversity and reliability-based transmissions of PDCCH may also be applied here.

In accordance with some embodiments, the UE is configured to receive an indication from the gNB or any other network node via a higher layer that indicates that the UE may receive one or more DCIs on a search space set associated with P>1 CORESETs, wherein each DCI is transmitted on one or more PDCCH candidate(s) using one of the following methods:

The transmit-processed DCI content is mapped to the L CCEs of a PDCCH candidate wherein the L CCEs of the PDCCH candidate are spread across P CORESETs, i.e., the L CCEs of the associated PDCCH candidate have to be collected from multiple CORESETs to decode the DCI.

The transmit-processed DCI content is mapped to LP CCEs of a PDCCH candidate on P CORESETs wherein the PDCCH candidate is configured with aggregation level L, i.e., each of the P CORESETs comprises L CCEs corresponding to a PDCCH candidate and the modulated DCI content is split across the LP CCEs of the PDCCH candidate—all the LP CCEs corresponding to the PDCCH candidate from all the associated CORESETs have to be collected to decode the DCI.

The DCI content is independently transmit-processed and mapped to the L CCEs of the PDCCH candidate associated with the DCI on each of the P CORESETs, i.e., the DCI content may be decoded from the L CCEs of the associated PDCCH candidate on just one of the associated CORESETs—the UE may combine or perform joint processing of the LP CCEs of the PDCCH candidate from the P CORESETs to improve the decoding reliability or performance.

For example, the association of a transmission method and/or scheme with a search space set that is configured with multiple CORESETs may be performed via higher layer signaling or a MAC-CE message. The MAC-CE message, for example, may comprise at least the following fields: a search space set pool ID, a field to indicate the transmission method and/or scheme. In another example, the transmission method and/or scheme may be generally indicated for all configured search space sets via a higher layer.

In the case of multiple TRP transmissions, the CORESETs associated with the search space set may belong to different CORESET pool index values.

In accordance with some embodiments, a search space set configured via a higher layer is associated with more than one CORESET in a serving cell via a higher layer signaling, wherein the CORESETs associated with the search space set are associated with different values of the parameter CORESETpoolIndex. This means that the PDCCH(s) associated with the specific search space set are transmitted from multiple TRPs on different CORESETs.

To have the same search space set in multiple CORESETs and to enable multiple or diversity-based reception of the same DCI content, the CORESETs may need some parameters to be identical, or at least to be similar.

In accordance with embodiments, if a search space set is associated with multiple CORESETs, at least one of the following parameters of one of the CORESETs is identical to the corresponding parameter of another CORESET associated with the same search space: the downlink bandwidth part where the frequency domain resources of the CORESET is configured, or the duration (in number of symbols).

UE Capabilities and PDCCH Overbooking

The UE has the capability to blindly decode a limited number of PDCCH candidates in a given slot on a serving cell. This capability is specified in the 5G NR standard [3] and is dependent on the waveform numerology of the serving cell. Similar to the number of PDCCH candidates the UE can blindly decode in a slot on a serving cell, there is also a limit of the number of CCEs the UE can monitor, i.e., the UE can receive and estimate the channel for. This capability is also dependent on the waveform numerology of the serving cell and is specified in [3].

In scenarios where multiple PDCCH candidates may be associated with a single DCI content, the case of PDCCH overbooking needs to be revisited. The UE capability specification in the current specification [3] deals with decoding of PDCCHs individually according to the monitored DCI format of the PDCCH candidate. With the proposed methods that associate multiple PDCCH candidates with a single DCI, multiple PDCCHs may be processed jointly to decode a DCI. Therefore, the UE's capability regarding joint processing and decoding of PDCCHs may be known to the network to schedule the PDCCHs, and also in the case of PDCCH overbooking to understand UE's limits. With the knowledge on the network side on whether the UE can perform individual decoding of each PDCCH candidate or can perform combined/joint processing of multiple PDCCH candidates to decode a DCI, during a PDCCH overbooking instance, depending on the configuration of the PDCCH, different UE capabilities may apply, and the network may have an understanding of the PDCCHs the UE decodes during overbooking.

In the case of PDCCH overbooking, the number of CCEs to be estimated and the number of PDCCH candidates to be monitored need to be revisited when the UE is configured with search space set pools or when a search space set is repeated in multiple CORESETs. In general, in any scenario that involves the joint processing of multiple PDCCH candidates to decode a single DCI, the UE capability with regards to the number of CCE channel estimations or PDCCH candidates monitoring needs to be addressed.

i) CCEs to be estimated: The number of CCEs that can be estimated by the UE, irrespective of the combined/joint processing of the PDCCH candidates that may be performed, may remain the same.

ii) PDCCH candidates to be monitored: The number of PDCCH candidates to be monitored may be modified depending on individual or joint processing of PDCCH candidates. According to the 3GPP Rel. 16 specification, the following definition is used for the term 'monitoring': "A UE monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats."

The current specification addresses only the individual decoding of each PDCCH and determines the PDCCH candidates to be decoded in case of overbooking based on this UE capability definition. When joint processing/decoding of some may be required, the UE capability of 'monitoring' and/or the interpretation of the existing UE capability may need to be modified.

To have an understanding on UE's PDCCH blind decoding capability in scenarios where multiple PDCCH candidates may be processed together to obtain a DCI, the following capability of UE's blind decoding is provided.

In accordance with some embodiments, a UE monitors a set of PDCCH candidates in one or more CORESETs on the active DL BWP on each activated serving cell configured with PDCCH monitoring according to corresponding search space sets, where monitoring of a set of M PDCCH candidates implies either one of the following:

individual processing of each PDCCH candidate in the set according to the monitored DCI formats, i.e., a total of up to M DCIs may be obtained, or processing of $G \geq 1$ groups of PDCCH candidates in the set, wherein each group comprises $K \geq 1$ PDCCH candidates, for decoding a single DCI according to the monitored DCI formats in the associated PDCCH candidates, i.e., a total of up to $D \leq G \leq M$ DCIs may be obtained (D can take any suitable value).

The second part of the definition of 'monitoring' may also cover the first part in the case that each group comprises K=1 PDCCH candidate and G=M groups—individual decoding of PDCCH candidates in M groups according to the monitored DCI formats is performed to obtain M DCIs, wherein each group comprises only one PDCCH candidate. In the UE processing according to the first part, blind decoding of each individual PDCCH candidate may be performed. According to the second part, combining and/or joint processing of one or more PDCCH candidates in a group may be performed to decode a DCI wherein a blind decoding process may be involved. The blind decoding in this case may include, among other processing, the unscrambling of the cyclic redundancy check (CRC) bits with various radio network temporary identifier (RNTI) values that the CRC of the DCI can be possibly scrambled with and performing the CRC check to verify if a valid DCI is present according to the DCI formats to be monitored.

In accordance with some embodiments, the above understanding of monitoring of PDCCH candidates by the UE may result in two different UE capabilities:

Capability 1: The number of PDCCHs/DCIs $M_{PDCCH,1}^{max}$ that can be decoded by the UE in a slot in a serving cell, wherein each PDCCH/DCI is decoded from a single PDCCH candidate according to the monitored DCI formats.

Capability 2: The number of PDCCHs/DCIs $M_{PDCCH,2}^{max}$ that can be decoded by the UE in a slot in a serving cell, wherein each PDCCH/DCI is decoded from one or more PDCCH candidate(s) according to the monitored DCI formats.

Capability 3: The number of PDCCHs/DCIs $M_{PDCCH,3}^{max}$ that can be decoded by the UE in a slot in a serving cell, wherein each PDCCH/DCI is decoded from either one or up to $N_{PDCCH}^{max}$ candidates according to the monitored DCI formats.

The above UE capabilities may be fixed in the specification or reported by the UE. The capabilities may be dependent on the numerology of the serving cell.

In addition to the above capabilities, a span-pattern-based capability may be defined.

In accordance with some embodiments, for a PDCCH monitoring span pattern (X,Y) in a slot, the following UE capabilities may be defined:

Capability 1A: The number of PDCCHs/DCIs $M_{PDCCH,1}^{max}$,(X,Y) that can be decoded by the UE for a span pattern (X,Y) in a slot in a serving cell, wherein each PDCCH/DCI is decoded from a single PDCCH candidate according to the monitored DCI formats.

Capability 2A: The number of PDCCHs/DCIs $M_{PDCCH,2}^{max(X,Y)}$ that can be decoded by the UE for a span pattern (X,Y) in a slot in a serving cell, wherein each PDCCH/DCI is decoded from one or more PDCCH candidates according to the monitored DCI formats.

Capability 3A: The number of PDCCHs/DCIs $M_{PDCCH,3}^{max,(X,Y)}$ that can be decoded by the UE for a span pattern (X,Y) in a slot in a serving cell, wherein each PDCCH/DCI is decoded from either one or up to $N_{PDCCH}^{max,(X,Y)}$ candidates according to the monitored DCI formats.

The above UE capabilities may be fixed in specification or reported by the UE. The capabilities may be dependent on the numerology of the serving cell.

In accordance with embodiments, the UE may report to the network its capability to monitor PDCCH candidates by reporting at least one of the following:

The maximum number of PDCCHs/DCIs $M_{PDCCH,1}^{max}$ that can be decoded by the UE in a slot in a serving cell. Each DCI is decoded from a single PDCCH candidate according to monitored DCI formats.

The maximum number of PDCCHs/DCIs $M_{PDCCH,2}^{max}$ that can be decoded by the UE in a slot in a serving cell. Each DCI is decoded from one or more PDCCH candidates according to monitored DCI formats.

$M_{PDCCH,3}^{max}$ and/or $N_{PDCCH}^{max}$ wherein the UE is capable of decoding up to $M_{PDCCH,3}^{max}$ PDCCHs/DCIs in a slot in a serving cell. Each DCI is decoded from either one or up to $N_{PDCCH}^{max}$ candidates Span pattern X,Y and/or $M_{PDCCH,1}^{max}$(X,Y) wherein the UE is capable of decoding up to $M_{PDCCH,1}^{max}$,(X,Y) PDCCHs/DCIs for a span pattern (X,Y) in a slot in a serving cell. Each DCI is decoded from a single PDCCH candidate according to monitored DCI formats.

Span pattern X,Y and/or $M_{PDCCH,2}^{max}$,(X,Y) wherein the UE is capable of decoding up to $M_{PDCCH,2}^{max}$,(X,Y) PDCCHs/DCIs for a span pattern (X,Y) in a serving cell. Each DCI is decoded from one or more PDCCH candidates according to monitored DCI formats.

The span pattern (X,Y) and/or the value $M_{PDCCH,3}^{max}$, (X,Y) and/or the value $N_{PDCCH}^{max}$,(X,Y) wherein the UE is capable of decoding up to $M_{PDCCH,3}^{max}$,(X,Y) PDCCHs/DCIs for a span pattern (X,Y) in a slot in a serving cell. Each DCI is decoded from either one or up to $N_{PDCCH}^{max}$,(X,Y) candidates.

The reported capabilities may be dependent on the numerology of the waveform and different values may be reported for different numerologies. The unreported values may be fixed in the specification. For example, for a given span pattern (X,Y), the value $M_{PDCCH,1}^{max}$,(X,Y) and $M_{PDCCH,2}^{max}$,(X,Y) may be fixed in the specification for various numerologies and the $M_{PDCCH,2}^{max}$,(X,Y) may be fixed for a specific number of PDCCH candidates that the UE can jointly process for a single DCI and/or for a specific number of DCIs in a slot that can be decoded via joint processing. Therefore, by reporting just the span pattern, the UE capability in monitoring PDCCH candidates is determined. In another example, for a given span pattern (X,Y) and $N_{PDCCH}^{max}$,(X,Y), the value $M_{PDCCH,3}^{max}$,(X,Y) may be fixed in the specification for various numerologies. Hence, by reporting just the span pattern and the value of $N_{PDCCH}^{max}$,(X,Y), the UE capability $M_{PDCCH,3}^{max}$,(X,Y) is determined. Depending on the type of capability and the values reported, the network may decide if a UE is able to decode a DCI via processing multiple PDCCH candidates or not. For example, if no $N_{PDCCH}^{max}$,(X,Y) value is reported or $N_{PDCCH}^{max}$,(X,Y)=1 is reported, the gNB may assume that the UE is not capable of processing multiple PDCCH candidates for a single DCI. This also helps the gNB in deciding on the configuration of search space set pools or configuring search space sets with multiple CORESETs as described above for the UE. For example, the parameter $N_{PDCCH}^{max}$ or $N_{PDCCH}^{max}$,(X,Y) may determine the size of the search space set pool that can be configured (and thereby the number of PDCCH candidates from different search space sets in the pool that are associated with the same DCI content) or the number of CORESETs that a search space set can be associated with. If no UE capability is reported, the gNB may assume that the UE is only capable of decoding every PDCCH candidate individually. In another alternative, if the UE is capable of a certain method of decoding—processing each individual PDCCH candidates for each DCI or processing one or more PDCCH candidates for each DCI—the UE may process the configured PDCCH(s) according to whichever method the UE is capable of processing them and/or whichever method of processing the configuration requires.

In cases when the UE is configured with one or more search space set pools or when one or more search space sets are configured with more than one CORESET in a cell, one of the UE capabilities described above may apply.

In accordance with embodiments, if a UE is configured with one or more search space set pools or when one or more search space sets are configured with more than one CORESET in a cell, the UE may have the capability to either decode up to $M_{PDCCH,2}^{max}$ PDCCHs/DCIs in a slot in a serving cell wherein each DCI is decoded from either one or up to $N_{PDCCH}^{max}$ candidates, or decode up to $M_{PDCCH,2}^{max}$,(X,Y) PDCCHs/DCIs for a span pattern (X,Y) in a slot in a serving cell wherein each DCI is decoded from either one or up to $N_{PDCCH}^{max}$,(X,Y) candidates.

This method may also apply in reverse, i.e., only when the UE reports the capability to process one or more PDCCH candidates to obtain a DCI, it expects the gNB to provide such a SS set or PDCCH configuration.

If the UE does not report any capability to process multiple PDCCH candidates (i.e., PDCCHs) to obtain a single DCI to the gNB or any other network entity, the UE may not, for example, expect the gNB to provide any higher layer configuration wherein multiple PDCCH candidates may be provided on one or more search space sets on one or more CORESETs that may have to be processed by the UE to decode a DCI. The network configuration may therefore be contingent on the UEs reporting of its capability of PDCCH decoding. Similarly, if no UE capability regarding PDCCH decoding is reported, the gNB may assume that the UE is only capable of decoding every PDCCH candidate individually and revert to state of the art UE capability assumptions.

It may also be possible that the UE may ignore any configuration provided by the network that involves combining or joint PDCCH processing if the UE is not capable of joint processing.

In accordance with an exemplary embodiment, if the UE does not report any capability to process multiple PDCCH candidates to decode a DCI to the gNB or any other network entity, and if the UE is provided by the gNB or any other network entity with a higher layer configuration wherein multiple PDCCH candidates may be provided on one or more search space sets on one or more CORESETs that may have to be processed by the UE to decode a DCI, the UE attempts to decode each PDCCH candidate individually. In the case when the DCIs are transmitted using transmission method 2, individual decoding may provide the underlying DCI but the reliability of the PDCCH is not enhanced by means of combining as the UE may not be capable of that operation. In the case when the DCIs are transmitted using transmission method 1, the UE will not be able to decode the DCI by this method.

In accordance with another exemplary embodiment, if the UE does not report to the gNB or any other network entity any capability associated with decoding a DCI associated with more than one PDCCH candidate, and if the UE is provided by the gNB or any other network entity with a higher layer configuration wherein a DCI is associated with more than one PDCCH candidate provided in one or more search space sets on one or more CORESETs, the UE attempts to decode or blindly decodes each PDCCH candidate individually.

In the above methods, the default assumption for the gNB for state of the art UEs and a differentiation with updated UEs is provided. The capabilities reported by the UE in the above method that are concerned with decoding a DCI associated with more than one PDCCH candidate may be at least one of, but not limited to, the following:
- one or more values related to number of monitored PDCCH candidates and/or monitored CCEs and/or blind decoding attempts that may be counted towards the UE's monitoring or blind decoding capability with respect to a group of PDCCH candidates that are associated with the same DCI content,
- the decoding method employed at the UE or the capability of the UE to employ a certain specific decoding method (for e.g., soft-combining, joint processing, selective decoding, etc.) to decode a DCI that is associated with more than one PDCCH candidate,
- the maximum number of search space set pools that can be supported in a given downlink bandwidth part and/or cell,
- the maximum number of PDCCH candidates that can be monitored in a slot or span in a cell if UE is capable of decoding a DCI associated with more than one PDCCH candidate, which may be subject to the number of groups of associated PDCCH candidates in given slot or span,
- the maximum number of CORESETs that can contain search space sets that are associated with search space set pools.

Once there is an understanding at the network side of the UE capability with respect to PDCCH decoding, which may vary in different scenarios of PDCCH configuration, the knowledge of the PDCCHs/DCIs that the UE may decode and the ones that may not be decoded during a PDCCH overbooking instance may be obtained by the network.

Blind Decoding Capabilities and Counting of Blind Decoding Attempts

As mentioned earlier, the UE has the capability to blindly decode a limited number of PDCCH candidates in a given slot on a serving cell and also the UE has the capability to monitor a limited number of CCEs, i.e., estimate the channel. Both capabilities are dependent on the waveform numerology of the serving cell and are specified in [3].

In scenarios where multiple PDCCH candidates may be associated with the same DCI content, methods for reporting UE capability with regards to blind detection/decoding and CCE estimation/monitoring, PDCCH overbooking, etc. were discussed previously in the disclosure. In this subsection, methods for the revision or redetermination of the blind decoding capabilities and/or the CCE estimation/monitoring capabilities are discussed.

The UE's capability in the current NR specifications [3] deals with decoding of PDCCHs individually according to the monitored DCI format of the PDCCH candidate. The number of PDCCH candidates that a UE is capable of blind decoding, in this case, is the same as the number of blind decoding attempts that the UE is capable of performing. With methods that associate multiple PDCCH candidates with a single DCI (which applies to any method provided in this disclosure or any such method in the NR specifications), multiple PDCCHs may be processed by the UE selectively or independently or jointly to obtain a single DCI. Therefore, the number of blind decoding attempts may be different from the number of PDCCH candidates configured in a given slot, or span in a cell. Hence, the counting of the number of blind decoding attempts, or the number of PDCCH candidates towards the UE's capability, should be revisited in the NR specifications. The UE's capability regarding the decoding of PDCCHs may be known to the network node in such cases to schedule the PDCCHs with the understanding of the UE's limits or capabilities.

Decoding of DCI from Multiple PDCCH Candidates

There can be two methods in which a DCI associated with multiple PDCCH candidates can be obtained (it is assumed here that each PDCCH candidate comprises a whole transmit-processed DCI):

i) Selective/individual decoding to obtain the DCI(s): When multiple PDCCH candidates are associated with the same DCI, the UE may attempt to blindly decode one or more PDCCH candidate(s) individually searching for a DCI. The order in which the PDCCH candidates are chosen or the choice and/or order of the PDCCH candidates that the UE attempts to blindly decode may be determined by the UE, predetermined and fixed in the NR specifications, or configured to the UE via a higher layer.

ii) Combining and/or joint processing to obtain the DCI(s): When multiple PDCCH candidates are associated with the same DCI, the UE may perform soft-combining, or any other method of joint-processing of two or more of the PDCCH candidates associated with the DCI, to obtain the DCI. The number of PDCCH candidates chosen for soft-combining and/or joint-processing may be determined by the UE, predetermined in the NR specifications, or configured to the UE via a higher layer.

The decoding method may depend on the transmission method used when multiple PDCCH candidates are associated with a single DCI. With transmission method 1 described earlier in the disclosure, joint processing of all the CCEs from all the associated PDCCH candidates may be required. With transmission method 2, either of the decoding methods may be used.

Individual or Selective Decoding of PDCCH Candidates

In the case of selective/individual decoding of multiple PDCCH candidates associated with a single DCI, the blind detection and CCE estimation limit are affected as follows:
  i) CCEs to be estimated/monitored: The number of CCEs to be estimated by the UE to decode a DCI depends on the number of PDCCH candidates that it attempts to blindly decode. If the DCI is obtained during the blind detection attempt of the first PDCCH candidate itself, then the UE does not attempt to decode the others. The number of CCEs monitored in this case is equal to the number of CCEs in the first PDCCH candidate. 'Monitoring of a CCE' in this case may mean the performance of at least one of the following operations on said CCE: estimation (one or more of the following estimation(s): channel estimation, noise power estimation, Doppler estimation, delay estimation, etc.), equalization, demodulation.
  ii) Number of blind decoding attempts: According to the 3GPP Rel. 16 specification, and as previously presented the following definition is used for the term 'monitoring': "A UE monitors a set of PDCCH candidates in one or more CORESETs on the active DL bandwidth part (BWP) on each activated serving cell configured with PDCCH monitoring according to corresponding search space sets where monitoring implies decoding each PDCCH candidate according to the monitored DCI formats." The term 'monitoring of a PDCCH candidate', in methods hereafter in this disclosure, may mean the performance of at least one of the following operations on the CCEs corresponding to said PDCCH candidate: estimation (one or more of the following estimation(s): channel estimation, noise power estimation, Doppler estimation, delay estimation, etc.), equalization, demodulation, decoding according to the DCI format(s) to be monitored in said PDCCH candidate. The number of monitored PDCCH candidates depend on the decoding attempt in which the DCI is obtained.

The number of CCEs to be estimated and the number of blind decoding attempts via individual or selective decoding to obtain a DCI when multiple PDCCH candidates are associated with a single DCI is therefore variable. The number of blind decoding attempts may vary from 1 to p, where p is the number of PDCCH candidates associated with the same DCI. There may be multiple ways to count the PDCCH candidates to be monitored or the number of blind decoding attempts and hence the CCEs to be estimated towards the UE's capability limit to capture the UE's actual capability in PDCCH decoding or monitoring when multiple PDCCH candidates are associated with the same DCI. Depending on the counting method, the gNB or the network node may determine the PDCCH scheduling or overbooking that can be done.

Soft-Combining and/or Joint-Processing of PDCCH Candidates

In the case of soft-combining and/or other joint-processing, methods performed by the UE to obtain the DCI from multiple PDCCH candidates associated with the same DCI, the blind detection and CCE estimation limit are affected as follows:
  i) CCEs to be estimated: The number of CCEs that can be estimated by the UE, irrespective of soft-combining or any other joint processing method used, is determined by the number of PDCCH candidates from the PDCCH candidates associated with the DCI used for the soft-combining and/or joint-processing.
  ii) PDCCH candidates to be monitored: The number of PDCCH candidates to be monitored may depend on the method in which the transmit-processed DCI(s) are included in the PDCCH candidates. If the DCIs in all the PDCCH candidates comprise the same stream of bits and/or have identical transmit-processing, then they may be soft-combined to perform a single blind decoding attempt. If the stream of bits in the DCI and/or the transmit-processing method used for the DCI(s) and/or the aggregation levels of the PDCCH candidates is different, either some joint processing method may be employed while performing one or more blind decoding attempts or more than one blind-decoding attempt may be required to process them separately.

Therefore, similar to the individual or selective decoding method, multiple possibilities of counting the CCEs or PDCCH candidates to be monitored or the number of blind decoding attempts towards the UE's capabilities for the same are available.

Methods for Counting of Monitored/Estimated PDCCH Candidates or of Blind Decoding Attempts In accordance with an embodiment, the UE is configured with a number of PDCCH candidates that are associated with one or more search space sets and one or more CORESETs in a given slot, or a given span in a cell, wherein one or more groups of PDCCH candidates may be present, wherein a group g comprises $p_g>1$ PDCCH candidates which are associated with the same DCI content. Then, the number of blind decoding attempts made by the UE and/or the number of blind decoding attempts counted for group g towards the UE's capability for the number of blind decoding attempts in the given slot, or the given span in the cell, may be one of the following:
  One blind decoding attempt,
  A number $s_g$ of blind decoding attempt(s), where the number $s_g$ of blind decoding attempt(s) is less or equal to the number of PDCCH candidate(s) in group g.

For a given blind decoding attempt, the number of PDCCH candidates or the number of CCEs estimated or monitored may vary depending on the decoding method employed by the UE. The number of PDCCH candidates or CCEs monitored by the UE, or the number of monitored PDCCH candidates or monitored CCEs counted for group g towards the UE's capability in each of the two cases is equal to the total number of PDCCH candidate(s) or the total number of CCEs estimated or monitored for all blind decoding attempt(s) combined.

The counting may be performed at the UE and/or a network node or gNB. The count may be used for the purpose of the scheduling of the PDCCH by the network.

In the following, we discuss different examples for the number of blind decoding attempts. In one example, the UE may perform a single blind decoding attempt and use all $p_g$ PDCCH candidates or a subset of the $p_g$ PDCCH candidates from the group for soft-combining and/or joint processing to obtain the DCI. This case may be possible when the PDCCH candidates of the group are obtained by an identical transmit-processing of the DCI and have an identical stream of bits and/or the same number of CCEs. In another example, the UE may perform a single blind decoding attempt by selecting a single PDCCH candidate from the group. The UE may select the 'best' PDCCH candidate based on a fixed or a network-indicated metric or criterion (e.g., random selection, received signal power, i.e., RSRP, RSSI, signal-to-interference-plus-noise ratio, priority of the PDCCH candidate, CORESET associated with the PDCCH candidate, or SS set associated with the PDCCH candidate, etc.) and attempts to blindly decode only that PDCCH candidate. If the metric or criterion is indicated by the network, the signaling for the same may be obtained via a higher layer. The selection of the PDCCH candidate may also be left to UE implementation without any signaling or any fixed criterion/metric in the NR specification, i.e., the UE may perform the selection of the PDCCH candidates to blind decode on its own without any NR specification or network node directive (for e.g., the criterion or metric the UE may use may be determined by its implementation, or the UE may just perform random selection without any criterion or metric). In these two examples, one PDCCH candidate may be counted towards the number of monitored PDCCH candidates or blind decoding limit.

In another example, $s_g$ ($1 \leq s_g \leq p_g$) blind decoding attempts may be counted towards the PDCCH monitoring or blind decoding limit and $t_g$ ($t_g > s_g, 1 \leq t_g \leq p_g$) PDCCH candidates from the group are used for blind decoding. For instance, there may be $s_g \leq p_g$ sets of PDCCH candidates among $t_g$ PDCCH candidates selected from the group, wherein the PDCCH candidates in each set are associated with the same DCI. Note that one PDCCH candidate may be a member of more than one of the $s_g$ sets. The UE may perform soft-combining and/or joint processing for each set of PDCCH candidates. Each set may selectively be decoded until a valid DCI is obtained. Note that the case $t_g = s_g$ corresponds to only one PDCCH candidate per set, thereby amounting to individual/selective decoding of each PDCCH candidate from a subset of PDCCH candidates from the group. The number of sets, in the worst case, that are attempted for blind decoding is counted towards the UE's blind decoding limit. In both cases $t_g > s_g$ and $t_g = s_g$, the worst case count, $s_g$, the maximum number of blind decoding attempts that may be made, is counted towards the UE's capability limit for blind detection.

In the cases mentioned above, the number of PDCCH candidates or CCEs estimated or monitored for a given group of PDCCH candidates associated with the same DCI content is equal to the total number of PDCCH candidates or CCEs that are estimated or monitored for all blind decoding attempts combined.

The UE may employ a combination of individual/selective decoding and soft-combining and/or joint processing. At higher carrier frequencies, such as mmWave for example, any obstacle between a transmit-receive point and a receiver may result in 'blockage'—a steep drop in the received power of the signal at the receiver due to an obstruction. This may cause the link to be highly unreliable or ultimately fail. Employing a hybrid decoding approach is useful when PDCCH candidate(s) is/are prone to blockage (for example, PDCCH candidates associated with different transmit-receive points (TRPs)). When a PDCCH candidate is prone to blockage, the beliefs of the bits (i.e., likelihood ratios) with respect to the transmitted codeword generated after the signal equalization at the UE may not be reliable. Therefore, when error-prone beliefs are processed at the decoder, there is a higher probability of getting an erroneous decoded codeword. In the case of soft-combining and/or joint processing when the likelihood ratios generated after the equalization of two different PDCCH candidates is combined, the likelihood ratios of the codeword bits obtained from a more reliable PDCCH candidate may be corrupted by the ones from a less reliable PDCCH candidate. The combination of the likelihood ratios from channels of varying SNRs may sometimes result in worse performance than the selective/individual decoding of the likelihood ratios from each channel. However, this phenomenon may not arise at higher SNRs. Therefore, to balance the performance in various SNR regimes, a combination of individual/selective decoding and soft-combining and/or joint processing may be employed at the UE. For instance, one or more PDCCH candidate(s) may be selected initially based on one or more given or pre-determined criterion/criteria and then a soft-combining and/or joint-processing based decoding of multiple PDCCH candidates may be performed. By this method, the UE may be robust enough to handle varying regimes of SNRs and varying reliabilities of bit likelihood ratios obtained from PDCCH candidates that are received from different links, with each link under independent and/or uncertain fading circumstances (such as blockage, pathloss differences, instantaneous fading, etc.).

In accordance with an embodiment, the UE may be provided with one or more criteria for the individual/selective processing or soft-combining and/or joint processing or a combination of individual/selective processing and soft-combining and/or joint processing of a group of PDCCH candidate(s), wherein more than one PDCCH candidates may exist in the group, and all the PDCCH candidates in the group are associated with the same DCI content.

In an example, the criterion/criteria may be fixed in the NR specifications, or it is provided via a higher layer signaling from a network node. For example, the UE may be configured to attempt blind decoding of the PDCCH candidate with the highest aggregation level in the group first, or to attempt blind decoding of only the PDCCH candidate with the highest aggregation level in the group. When multiple PDCCH candidates are configured with the highest aggregation level value in the group, the UE may attempt decoding of either one of them or may perform soft-combing and/or joint processing of them. The corresponding UE behavior may be fixed in the NR specifications or indicated by a network node via higher layer signaling to the UE. In another example, the UE may be configured to attempt blind decoding of the PDCCH candidate with the higher received signal power. The received power to be considered, for example, may be the reference signal received power (RSRP) measured from a DMRS or CSI-RS or SSB that is associated with the CORESET or the PDCCH candidate (via QCL reference for instance) or a reference signal strength indication (RSSI) measurement or a reference signal receive quality (RSRQ) measurement, or any other measurement provided in the NR specifications that can be obtained by the UE.

In accordance with an embodiment, the criterion or criteria for the processing of a group of PDCCH candidate(s), wherein more than one PDCCH candidate may exist in the group, and all the PDCCH candidates in the group are associated with the same DCI content, may be at least one of the following: the aggregation level of one or more of the PDCCH candidates, RSSI measurement(s), RSRQ measurement(s), the RSRP or SINR obtained from the measurement of at least one DMRS or CSI-RS or SSB, the ID of a search space set associated with at least one of the PDCCH candidates, the search space set group ID(s) associated with a search space set that is associated with at least one of the PDCCH candidates, the search space type associated with at least one of the search space set(s) associated with at least one of the PDCCH candidates, the DCI format(s) to be monitored in at least one of the PDCCH candidates.

Additional Considerations in the Counting of the Number of Blind Decoding Attempts:

In the methods described above regarding the counting of the number of blind decoding attempts, the total number of attempts in decoding was the only parameter considered for the counting. Depending on the method used for the transmission of the PDCCH candidates associated with the same DCI content and the decoding techniques used, the number of blind decoding attempts counted may be different. For example, in the case of soft-combining or hybrid decoding, the LLRs calculated from two different PDCCH candidates associated with the same DCI content might have to be stored before combining for blind decoding. In this case, the memory used for the storage for the LLRs may have to be considered, as the memory is blocked and not usable for the LLRs of any other PDCCH candidate for blind decoding. Therefore, even though only one blind decoding attempt is actually being made from the two PDCCH candidates, the memory used for the LLRs may not allow the blind decoding attempt of some other PDCCH candidate(s). Therefore, while the UE has a capability of the number of blind decoding attempts that it could make in a given span or a slot in a given cell, the number of blind decoding attempts of said capability that the two PDCCH candidates that are associated with the same DCI content take up has to be counted with such UE processing bottlenecks accounted for.

In accordance with an embodiment, the UE is configured with a number of PDCCH candidates that are associated with one or more search space sets and one or more CORESETs in a given slot, or a given span in a cell, wherein one or more groups of PDCCH candidates may be present, wherein a group g comprises $p_g > 1$ PDCCH candidates which are associated with the same DCI content. Then, the number of blind decoding attempts made by the UE and/or the number of blind decoding attempts counted for group g towards the UE's capability for the number of blind decoding attempts in the given slot, or the given span in the cell, may be $s_g$ blind decoding attempt(s), where $s_g$ is less or equal to twice the number of PDCCH candidate(s) in group g.

The count of $s_g \geq p_g$ may be applicable in the case of hybrid decoding or soft-combining cases when there are bottlenecks at the UE's receiver architecture (e.g., the memory used for the LLRs obtained from the PDCCH candidates) and/or when the PDCCH candidates are transmitted within the same slot or a span.

In the case of inter-slot/inter-span transmissions of PDCCH candidates associated with the same DCI content, the count made due to, say, the memory usage for the LLRs, may have to be carried over to another slot or span.

In accordance with embodiments, the UE is configured with a number of PDCCH candidates that are associated with one or more search space sets and one or more CORESETs, wherein one or more groups of PDCCH candidates may be present, wherein a group g comprises $p_g > 1$ PDCCH candidates which are associated with the same DCI content. If at least one of the said PDCCH candidates is in a slot or a span different from that of at least one of the other said PDCCH candidates in a cell, then the number of blind decoding attempts made by the UE and/or the number of blind decoding attempts counted for group g towards the UE's capability for the number of blind decoding attempts in a slot t or span t in the cell is a value $x_t \geq y_t$, wherein $x_t > 0$ and $y_t \geq 0$ is less than or equal to the number of PDCCH candidates in the group g received before slot t or span t in the cell, i.e., the number of PDCCH candidates associated with the same DCI content received before said slot or span in the cell. For example, if two PDCCH candidates associated with the same DCI content are received by the UE and one PDCCH candidate is received in slot t−k and the other is received in slot t, wherein k>0, then at slot t, the UE may count a value of at least $0 < y_t < 1$ towards the UE's blind decoding capability $x_t$ in slot t. It may be noted that in a given slot or span t, $x_t = y_t + z_t$, where $z_t \geq 0$. In slot t−k, in the given example, the number of blind decoding attempts counted towards the UE's capability may be $x_{t-k} = t_{t-k}$, wherein $0 < y_{t-k} \leq 1$. The value of $Y_{t-k}$ may depend on the method of decoding used by the UE, e.g., selective decoding, soft-combining or hybrid decoding.

UE Capability Reporting with Respect to a Type of Decoding Method Employed

The UE's decoding capability, irrespective of the decoding method employed (individual/selective decoding or combined decoding/joint processing), the gNB may be apprised of the UE's capability with respect to the decoding process to determine the number of PDCCH candidates and CCEs to be counted towards UEs capability limit.

In accordance with an embodiment, the UE is configured to report to a network node or gNB, a parameter that indicates whether the UE is capable of individual/selective decoding and/or joint/combined decoding/processing of PDCCH candidates that are associated with the same DCI or same DCI content. For example, the UE reporting parameter may be titled 'decodingDCIfromMultiplePDCCHcandidates' and the values taken may be 'selection', 'combining' or 'selectionAndCombining'. Hence, according to an embodiment, the method performed by the UE comprises reporting to the network node, said parameter that indicates whether the UE is capable of individual/selective decoding and/or joint/combined decoding/processing of PDCCH candidates that are associated with the same DCI or same DCI content.

In addition, the maximum number of PDCCH candidates that may be selected or combined by the UE for decoding the DCI may also be reported to a network node.

In accordance with an embodiment, the UE is configured to report to a network node or gNB, a parameter that indicates the number of PDCCH candidates it may attempt to blindly decode individually to obtain a DCI when multiple PDCCH candidates may be associated with the same DCI or same DCI content. For example, the parameter may be titled 'numberOfBDPDCCHcandidatesForSelectiveDecoding' and may take an integer value, e.g., 1, 2, 4. Hence, according to an embodiment, the method performed by the UE comprises reporting to the network node, said parameter that indicates the number of PDCCH candidates it may attempt to blindly decode individually to obtain a DCI when multiple PDCCH candidates may be associated with the same DCI or same DCI content.

In accordance with an embodiment, the UE is configured to report to a network node or gNB, a parameter that indicates the number of PDCCH candidates it may combine/jointly process to perform blind decoding in search of a valid DCI when multiple PDCCH candidates may be associated with the same DCI or same DCI content. For example, the parameter may be titled 'numberOfBDPDCCHcandidates- ForCombinedDecoding' and may take an integer value, e.g., 1, 2, 4. Hence, according to an embodiment, the method performed by the UE comprises reporting to the network node, said parameter that indicates the number of PDCCH candidates it may combine/jointly process to perform blind decoding in search of a valid DCI when multiple PDCCH candidates may be associated with the same DCI or same DCI content The UE may also be able to report to the network node or gNB, which value or which method of counting the PDCCH candidates or blind decoding attempts applies to it.

In accordance with an embodiment, the UE is configured to report to a network node, or gNB, one of the following:
  One or more values for the number of monitored PDCCH candidates and/or monitored CCEs and/or blind decoding attempts that may be counted towards the UE's monitoring or blind decoding capability with respect to a group of PDCCH candidates that are associated with the same DCI content.
  One or more indices or parameters, each of which indicates a number of monitored PDCCH candidates and/or monitored CCEs and/or blind decoding attempts that may be counted towards the UE's monitoring or blind decoding capability with respect to a group of PDCCH candidates that are associated with the same DCI content.

The reported value(s) may be dependent on the decoding method(s) that the UE employs—individual/selection decoding, soft-combining and/or joint processing, hybrid decoding methods.

The gNB or a network node may indicate to the UE the number of monitored PDCCH candidates and/or monitored CCEs and/or blind decoding attempts that are counted towards the UE's blind decoding capability with respect to a group of PDCCH candidates associated with the same DCI or DCI content. In the case the UE reports multiple values for the aforementioned parameters, the indication from the gNB or network node may provide guidance to the UE on the method to use for the decoding of the PDCCH candidates and the counting towards the BD limit.

In accordance with embodiments, the UE is configured to receive from a network node, or gNB, one of the following indications via the PHY layer or a higher layer:
  One or more values for the number of monitored PDCCH candidates and/or monitored CCEs and/or blind decoding attempts that may be counted towards the UE's blind decoding capability with respect to a group of PDCCH candidates that are associated with the same DCI or DCI content.
  One or more indices or parameters, each of which indicates a number of monitored PDCCH candidates and/or monitored CCEs and/or blind decoding attempts that are counted towards the UE's blind decoding capability with respect to a group of PDCCH candidates that are associated with the same DCI or DCI content.

The description of the methods that may be employed and the counting of the blind decoding attempts and thereby the number of monitored PDCCH candidates or monitored CCEs for each method is provided above in the disclosure.

PUCCH Resource Determination in an Event of DCI Repetition or DCI Multi-Chance

The DCI may comprise a PUCCH resource indicator (PRI) field that indicates a request for a transmission of uplink control information (UCI). The PUCCH resource used for the uplink transmission of the UCI is selected from one or more PUCCH resource(s) in a PUCCH resource set.

In some examples, the PUCCH resource selected in the PUCCH resource set for the UCI transmission is indicated by the PRI field in the DCI.

In such a case, each codepoint of the PRI field may be associated with a PUCCH resource in the PUCCH resource set. For example, if the PRI field comprises a b-bit field and the PUCCH resource set comprises $2^b$ resources, a mapping between the codepoints of the PRI field to the PUCCH resources in the PUCCH resource set is used so that the PUCCH resource used for the transmission of the UCI is indicated by a value of the b-bit PRI field. However, when the number of PUCCH resources in the PUCCH resource set comprises more than $2^b$ PUCCH resources, the $2^b$ codepoints of the PRI field are not sufficient to indicate the PUCCH resource in the PUCCH resource set. In such cases, additional parameters such as the number of CCEs in the CORESET on which the DCI is transmitted and/or the index of the first CCE of the PDCCH candidate associated with the DCI, may be used to indicate the PUCCH resource as described by the following embodiments.

In accordance with embodiments, when at least two PDCCH candidates from one or more search space sets in one or more CORESETs are associated with the same DCI or DCI content, the UE may determine the PUCCH resource or derive the index of the PUCCH resource to be used for an uplink transmission of an uplink control information (UCI) based on at least one or more of the following values:
  the value indicated in the PUCCH resource indicator (PRI) field in the DCI, and/or
  the number of CCEs from at least one CORESET associated with one or more of the PDCCH candidate(s), and/or
  the index of the first CCE from at least one of the PDCCH candidates.

The PUCCH resource set which said PUCCH resource belongs to may be determined according to any method provided in the NR specifications.

In an exemplary embodiment, when there are two or more PDCCH candidates which are associated with the same DCI or the same DCI content, and the two or more PDCCH candidates are from one or more search space sets in at least two different CORESETs, the PUCCH resource or the index of the PUCCH resource is determined from the number of CCEs in the CORESET with the lowest ID or highest ID value. The CORESET with the lowest or highest ID value may be considered as the 'default CORESET' here for the transmission of the DCI, or the PUCCH resource determination for the transmission of UCI. For example, if the two or more PDCCH candidates are associated with search space sets in two CORESETs whose ID values are $C_1$ and $C_2$, with $C_1 < C_2$, the PUCCH resource is determined using the number of CCEs in CORESET $C_1$. In some examples, when CORESET 0 is one of the at least two different CORESETs, this CORESET is the 'default CORESET' for the determination of the PUCCH resource for the uplink transmission of the UCI. Note that CORESET 0 is a special CORESET that can be used for transmitting system information from a network node or gNB to the UE.

In an exemplary embodiment, the at least two different CORESETs may comprise at least one CORESET that is not associated with a CORESETpoolIndex value. In such a case, the PUCCH resource is determined using the number of CCEs in the CORESET configured without a CORESETpoolIndex value among said CORESETs. In some examples, the PUCCH resource is determined using the number of CCEs in the CORESET with the lowest ID or highest ID value from the CORESETs configured without a CORE- SETpoolIndex value if multiple CORESETs without CORESETpoolIndex value are present among said CORESETs. Note that the CORESETpoolIndex value may be used in multi-TRP scenarios where the association of a CORESET with a given CORESETpoolIndex value, or the lack of an association of a CORESET with a CORESETpoolIndex value, may determine an associated TRP of a CORESET. When one or more CORESET(s) is/are associated with CORESETpoolIndex 0 or not associated with any CORESETpoolIndex value, it may mean that the one or more CORESET(s) is/are associated with a first TRP. In such a case, the first TRP is chosen as the default TRP for the DCI transmission or the PUCCH resource determination.

In an exemplary embodiment, each CORESET of the at least two different CORESETs is associated with a CORESETpoolIndex value. Then, the PUCCH resource is determined from the number of CCEs in a CORESET configured with CORESETpoolIndex value 0 among said CORESETs. In some examples, the PUCCH resource is determined using the number of CCEs in the CORESET with the lowest or highest ID value among the CORESETs configured with CORESETpoolIndex value 0 if multiple CORESETs with CORESETpoolIndex value 0 are present among said CORESETs. In another example, the 'default TRP' (the first TRP in this case) is essentially chosen based on the lowest CORESETpoolIndex value among said CORESETs, i.e., the number of CCEs from a CORESET configured with the lowest CORESETpoolIndex value is chosen for the PUCCH resource determination.

In an exemplary embodiment, when there are at least two PDCCH candidates which are associated with the same DCI or DCI content and the at least two PDCCH candidates are from one or more search space sets in one or more CORESETs, the PUCCH resource or index of the PUCCH resource is determined from the index of the first CCE of a PDCCH candidate associated with the CORESET from which the number of CCEs were obtained for the determination of the PUCCH resource. In the case that there are multiple PDCCH candidates that are associated with said DCI on said CORESET, the PUCCH resource is determined from the index of the first CCE of the PDCCH candidate with the lowest or the highest PDCCH candidate index, or from the PDCCH candidate with the lowest or the highest value for the index of the first CCE from said PDCCH candidates.

A generalization of the above method would be to determine a PDCCH candidate for the PUCCH resource determination without any dependence on the CORESET that is decided to be used for the same.

In an exemplary embodiment, when there are at least two PDCCH candidates from one or more search space sets in one or more CORESETs which are associated with the same DCI or DCI content, the PUCCH resource or index of the PUCCH resource is determined using at least one of the following values:
  the index of the first CCE of the PDCCH candidate with the lowest PDCCH candidate index among the PDCCH candidates associated with the DCI, or
  the index of the first CCE of the PDCCH candidate with the lowest value for the index of the first CCE of the PDCCH candidate among the PDCCH candidates associated with the DCI.

For the present scheme, there is more scheduling flexibility for the gNB by not rooting the PDCCH candidate to a specific CORESET.

In addition to the above methods, a combination of multiple values obtained from the CORESETs or PDCCH candidates associated with a DCI content to determine the PUCCH resource for the UCI transmission may be considered to provide additional scheduling flexibility at the gNB.

In an exemplary embodiment, when there are at least two PDCCH candidates from two or more search space sets in at least two different CORESETs which are associated with the same DCI or DCI content, the PUCCH resource or the index of the PUCCH resource used for the transmission of the UCI is determined based on a scalar function that depends on the number of CCEs of more than one CORESET from said CORESETs, e.g., the minimum, the maximum, the average or any other linear function of the number of CCEs of at least two or more of said CORESETs.

In an exemplary embodiment, when there are at least two PDCCH candidates from two or more search space sets in at least two different CORESETs which are associated with the same DCI or DCI content, the PUCCH resource or the index of the PUCCH resource used for the transmission of the UCI is determined based on a scalar function that on the indices of the first CCE of at least two or more of said PDCCH candidates, for e.g., the minimum, the maximum, the average or any other linear function of the indices of the first CCE of two or more of said PDCCH candidates.

Miscellaneous Issues Related to PDCCH Repetition
Random Access Order Via PDCCH

For a UE to connect to a network, downlink and uplink synchronization is required. For DL synchronization, the UE receives and/or decodes a synchronization signal-physical broadcast channel block, SS/PBCH block or SSB, from a network node or gNB. A random access procedure may be carried out by the UE and gNB after this step for uplink synchronization and RRC connection/reconnection, which can be performed in two ways: contention-based and contention-free. In contention-based random access, the UE choses a preamble on its own and performs the random access procedure, which may lead to collision/interference with other UEs. In contention-free random access, the gNB or any other network node provides the preamble for access to enable the UE to perform the random access procedure. This enables the random access process initiated by a UE to happen without any collision/interference from other UEs. The random access step by the UE is followed by a random access response from the gNB and a few other steps to complete the uplink synchronization and/or RRC connection/reconnection. The random access procedure may be associated with a received or decoded SSB or CSI-RS resource, i.e., the settings from a SSB or CSI-RS resource reception/decoding may be used for transmissions/receptions by the UE during the random access procedure. When the random access order for a UE to trigger a contention-free random access is provided via a DCI associated with multiple PDCCH candidates, conflicts may arise regarding the timeline of the random access procedure or the quasi-colocation assumptions regarding the PDCCH or the random access response received in the PDSCH or the PDCCH during the random access procedure. The following methods can be used for the resolution of the arising conflicts in UE's decision.

In accordance with embodiments, the UE is not configured to or the UE does not expect to receive a PDCCH/DCI that is associated with more than one PDCCH candidate with an order that triggers a contention-free random access. This enables the UE to receive the PDCCH providing the random access order with the QCL assumptions of the SSB that it decoded for random access procedure.

In accordance with embodiments, a UE is configured to receive a PDCCH/DCI that is associated with more than one PDCCH candidate with an order that triggers a contention-free random access wherein the QCL assumptions for the reception of all the PDCCH candidates associated with the DCI are obtained from a SSB or a CSI-RS resource used for or associated with a random-access procedure, i.e., the PDCCH candidates may be assumed to be quasi-colocated with said SSB or CSI-RS resource with respect to one or more of the following parameters: Doppler shift, Doppler spread, average delay, delay spread, spatial RX parameters. This may mean that the repetition of the random-access order via single TRP. In one example, the PDCCHs providing the order that triggers the contention-free random access may belong to the same CORESET. In that case, the association of the PDCCHs with a single TRP can be ensured.

In accordance with embodiments, a UE is configured to receive a PDCCH/DCI that is associated with more than one PDCCH candidate with an order that triggers a contention-free random access wherein the QCL assumptions for the reception of one of the PDCCH candidates is obtained from a SSB or a CSI-RS resource $S_1$ used for or associated with a random access procedure and the QCL assumptions for the reception of at least one other PDCCH candidate among the associated PDCCH candidates is obtained from a SSB or CSI-RS resource $S_2$, different from the resource $S_1$. The SSB or CSI-RS resource $S_2$ may be chosen from one or more of the following:
  a SSB or a CSI-RS resource used for the QCL assumption of the CORESET with the lowest ID in the active downlink bandwidth part.
  a SSB or a CSI-RS resource provided in the lowest active TCI state in the active downlink bandwidth part.
  a SSB or a CSI-RS resource transmitted most recently before or after a certain time t'.
  a SSB or a CSI-RS resource used for or associated with a random-access procedure.

The time reference t' may be determined based on at least one of the following:
  a PDCCH/PDCCH candidate or a symbol of a PDCCH candidate on which a message that triggers a contention-free random access is received,
  a symbol on which one or more physical random access channel transmission is performed by a UE.

This may enable the association of the PDCCHs carrying the order triggering the random access with different TRPs. For example, the at least two PDCCHs among the said PDCCHs may be associated with two different CORESETs, which enables configuration of the transmission of the random-access orders from different TRPs.

In accordance with embodiments, a UE is configured to receive a PDCCH/DCI that is associated with more than one PDCCH candidate with an order that triggers a contention-free random access wherein the QCL assumptions for the reception of one of the PDCCH candidates is obtained from a SSB or a CSI-RS resource $S_1$ and the QCL assumptions for the reception of at least one other PDCCH candidate among the associated PDCCH candidates is obtained from a SSB or CSI-RS resource $S_2$. The SSB or CSI-RS resources $S_1$ and $S_2$ are chosen from one or more of the following:
  a SSB or a CSI-RS resource used for the QCL assumption of the CORESET with the lowest ID in the active downlink bandwidth part.
  a SSB or a CSI-RS resource provided in the lowest active TCI state in the active downlink bandwidth part.
  a SSB or a CSI-RS resource transmitted most recently before or after a certain time t'.
  a SSB or a CSI-RS resource used for or associated with the random-access procedure.

The time reference may be determined as mentioned before. The resources $S_1$ and $S_2$ may be the same or different in this case and they may be chosen from one or more of the choices provided above.

SRI Indication when Scheduling PUSCH

When a PUSCH is scheduled using a DCI, an SRS resource indicator (SRI) may be provided in the DCI and the SRI must be associated with an SRS transmission. When a DCI is associated with more than one PDCCH candidate, then the SRS resource or SRS resource set transmission with which the indicated SRI is associated with must be resolved.

In accordance with embodiments, a UE is configured to receive a PDCCH/DCI associated with more than one PDCCH candidate that schedules at least one PUSCH transmission, wherein the PDCCH/DCI may comprise at least one SRS resource indicator (SRI) field or at least one SRI value that is associated with an SRS resource or SRS resource set transmission most recently transmitted by the UE before a certain time t̂, wherein t̂ may be determined based on at least one of the following:
  the PDCCH candidate or a symbol of the PDCCH candidate that starts or ends the earliest in time among the PDCCH candidates associated with said DCI,
  the slot in which the PDCCH candidate that starts or ends earliest in time among the PDCCH candidates associated with said DCI is received.

In this method, the SRI indicated in the DCI refers to the same SRS resource or resource set in all the associated PDCCH candidates.

In a different method, the SRI indicated in different DCIs may be permitted to indicate different SRS resources.

In accordance with embodiments, a UE is configured to receive a PDCCH/DCI associated with more than one PDCCH candidate that schedules at least one PUSCH transmission, wherein the PDCCH/DCI may comprise at least one SRS resource indicator (SRI) field value or at least one SRI value that is associated with an SRS resource or SRS resource set transmission most recently transmitted by the UE before a certain time t, wherein t may be determined based on at least one of the following:
  the PDCCH candidate or a symbol of the PDCCH candidate that starts or ends the latest in time among the PDCCH candidates associated with said DCI,
  the slot in which the PDCCH candidate that starts or ends latest in time among the PDCCH candidates associated with said DCI is received.

In this case, when PDCCHs associated with the DCI are repeated in different slots or in the same slot with SRS transmission(s) in between the PDCCHs, the SRI association with the SRS resource or SRS resource set can be updated between the different PDCCH transmissions.

Referring to FIG. 8, there is provided a method performed by a UE according to some embodiments previously described: As shown, the method comprises:
  (801) receiving from a network node (or gNB), via a higher layer, a configuration of one or more search space sets which are associated with one or more CORESETs, for one or more PDCCHs, wherein each search space set comprises a number of PDCCH candidates and each PDCCH candidate comprises or is made up of a number of resource elements, also called control channel elements (CCEs) and the UE monitors for one or more DCIs of a specific format or formats as indicated via a higher layer in the configured PDCCH candidates;
  (802) wherein a configuration or an indication of an association of one or more said search space sets with a search space set pool is provided to the UE, wherein at least two PDCCH candidates from one or more search space sets in the search space set pool are associated with the same DCI content; and (803) applying the configuration(s) or indication(s) for receiving one or more PDCCH(s) on the search space sets.

According to an embodiment, the configuration or indication that provides the association of one or more said search space sets with a search space set pool may be signaled to the UE via a higher layer from a network node (or gNB) or it is a priori known to the UE, for example, it is fixed in the specification.

According to an embodiment, the higher layer configuration of a search space set pool includes a list of identifiers of the search space sets that belong to the search space set pool.

According to an embodiment, the higher layer configuration comprises an index or an indicator, or an identifier that identifies the search space set pool.

According to an embodiment, the configuration is received, from the network node, in a MAC-CE message that includes a list of identifiers of the search space sets and optionally a search space set pool index.

The method further comprises monitoring the at least two PDCCH candidates on one or more search space sets. The method may further comprise combining or jointly processing at least two PDCCHs received on said at least two PDCCH candidates to decode the DCI. The combining or jointly processing of the at least two PDCCH candidates is performed during the decoding of the DCI.

According to an embodiment, the PDCCH candidates of the search space sets in the search space set pool that are associated with the same DCI content are of the same aggregation level or different aggregation levels.

According to an embodiment, the method performed by the UE comprises receiving from the network node an indication indicating, in the case when multiple PDCCH candidates are associated with a single DCI, whether each associated PDCCH candidate comprises a part of the transmit-processed DCI or each associated PDCCH candidate comprises the whole of the transmit-processed DCI.

According to an embodiment, each search space set is associated with at least one CORESET and each CORESET is associated with a parameter CORESETpoolIndex, and wherein at least two CORESETs associated with two different search space sets in the search space set pool are configured with different values of the parameter CORESETpoolIndex.

According to an embodiment, a value of at least one of the following parameters configured for a search space set is identical to the corresponding parameter configured for another search space set: search space type, DCI format(s) to be monitored, monitoring slot periodicity and offset, search space duration and downlink bandwidth where the frequency domain resources of the associated CORESET are configured.

According to an embodiment, a method performed by a UE comprises receiving from a network node, via a higher layer, a configuration of a search space set associated with more than one CORESET in a serving cell, wherein a configuration or indication of an association of a search space set with one or more CORESETs may be provided to the UE, wherein the search space set comprises a number of PDCCH candidates, each comprising one or more CCEs, and wherein PDCCH(s) associated with said search space set is/are transmitted on one or more CORESET(s) associated with the search space set and hence, the CCEs corresponding to a PDCCH candidate in the search space set may be mapped to one or more of the associated CORESETs. The method may further comprise, applying the configuration(s) or indication(s) for receiving one or more PDCCH(s) on the search space set.

According to an embodiment, the configuration or indication that provides the association of a search space set with one or more CORESETs may be signaled to the UE via a higher layer from a network node (or gNB) or it is a priori known to the UE, for example, it is fixed in the specification.

According to an embodiment, the association of a search space set with two or more CORESETs may be performed via the higher layer configuration of the search space set, or a MAC-CE message or via a higher layer information element that that provides a list of associated CORESETs for a search space set.

According to an embodiment, a method performed by the UE comprises monitoring a set of PDCCH candidates in one or more CORESETs on an active downlink bandwidth part on each activated serving cell configured with PDCCH monitoring according to corresponding search space sets. If a search space set is associated with multiple CORESETs, at least one of the following parameters of one of the CORESETs is identical to the corresponding parameter of another CORESET associated with the same search space: the downlink bandwidth part where the frequency domain resources of the CORESET is configured, or the duration in number of symbols. According to an embodiment, the method performed by the UE comprises reporting, to the network node, the capability of the UE indicating the number of PDCCHs and/or DCIs that the UE is capable in decoding in a slot in a serving cell.

According to an embodiment, a method performed by a UE comprises:
Processing up to $A_1$ PDCCH candidates in a slot in a serving cell to obtain up to $D_1 \leq A_1$ DCIs ($D_1$ and $A_1$ may take any suitable values), wherein each DCI is obtained from blind decoding of a single PDCCH candidate, if:
the UE is capable of performing blind decoding of each PDCCH candidate individually, or
the UE reports the capability for the individual decoding of each PDCCH candidate to a network node, or
the configuration of the PDCCH(s) requires individual decoding of each PDCCH candidate, and
Processing up to $A_2$ PDCCH candidates in a slot in a serving cell to obtain up to $D_2 \leq A_2$ DCIs ($D_2$ and $A_2$ may take any suitable values), wherein each DCI may be decoded from processing of one or more PDCCH candidates, if:
the UE is capable of performing decoding of a DCI from one or more PDCCH candidates, or
the UE reports, to a network node, the capability to perform decoding of a DCI from one or more PDCCH candidates, or
the configuration of the PDCCH(s) requires decoding of a DCI from one or more PDCCH candidates.

According to an embodiment, the PDCCH candidates are configured in a given slot, or in a given span in a cell, wherein a group g of PDCCH candidates comprises $p_g > 1$ PDCCH candidates which are associated with the same DCI content.

According to an embodiment, the method performed by the UE may comprises, performing a number of blind decoding attempts counted for group g in the given slot, or in the given span in the cell, wherein the number of blind decoding attempts is one of the following:
- one blind decoding attempt,
- a number $s_g$ of blind decoding attempts, wherein $s_g$ is less or equal to the number of PDCCH candidates in said group g.

According to an embodiment, the method performed by the UE may comprise, reporting to the network node, one of the following:
- a number of monitored PDCCH candidates and/or a number of monitored CCEs and/or a number of blind decoding attempts with respect to the group of PDCCH candidates that are associated with the same DCI content;
- an index or a parameter that indicates a number of monitored PDCCH candidates and/or a number of monitored CCEs and/or a number of blind decoding attempts with respect to the group of PDCCH candidates that are associated with the same DCI content.

Additional actions performed by the UE have already been described.

Figure 9:
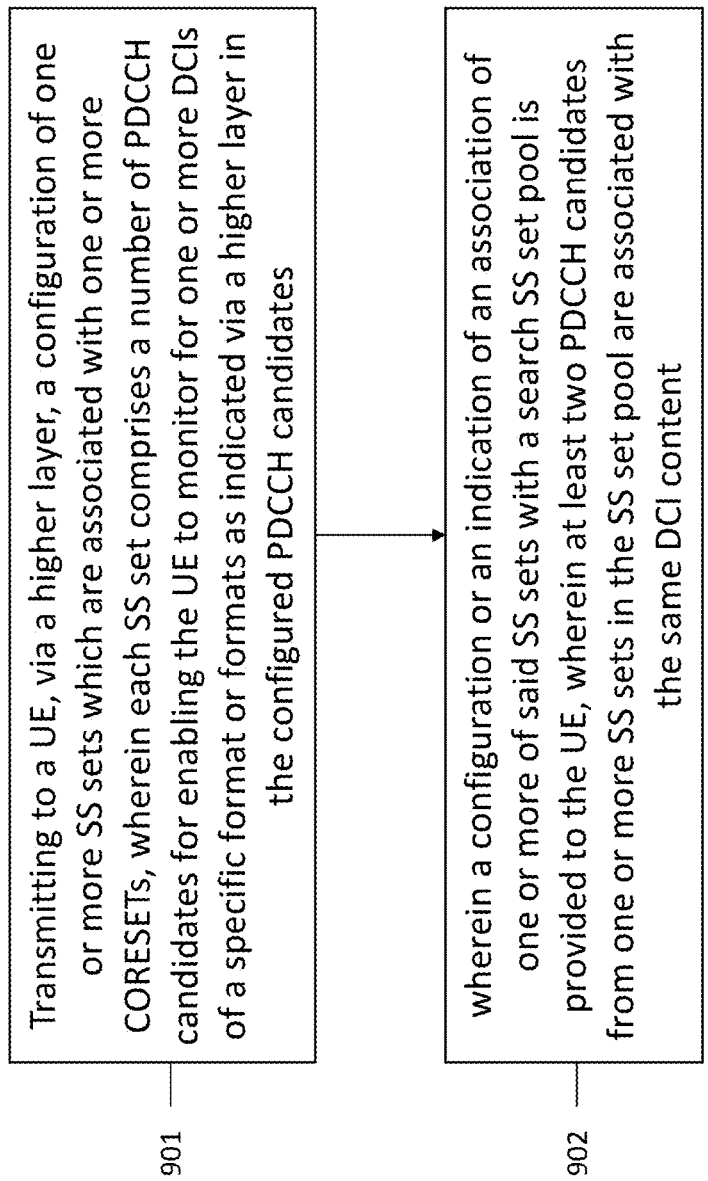
FIG. 9 illustrates a flowchart of a method performed by a network node according to some embodiments

Referring to FIG. 9, there is provided a method performed by a network node or gNB according to some embodiments previously described: As shown, the method comprises:
- (901) transmitting to a UE, via a higher layer, a configuration of one or more search space (SS) sets which are associated with one or more CORESETs, for one or more PDCCH(s), wherein each search space set comprises a number of PDCCH candidates and each PDCCH candidate comprises or is made up of a number of CCEs, for enabling the UE to monitor one or more DCIs of a specific format or formats as indicated via a higher layer in the configured PDCCH candidates;
- (902) wherein a configuration or an indication of an association of one or more of said search space sets with a search space set pool is provided to the UE, wherein at least two PDCCH candidates from one or more search space sets in the search space set pool are associated with the same DCI content.

As previously described, when the network node or gNB transmits the configuration(s) to the UE, the UE applies the configurations for receiving one or more PDCCHs on the search space sets, transmitted by the network node. Additional actions performed by the network node or gNB have already been described.

According to an embodiment, a method performed by a network node comprises transmitting to a UE, via a higher layer, a configuration of a search space set wherein the search space set is associated with more than one CORESET in a serving cell, wherein a configuration or indication of the association of the search space set with one or more CORESETs is provided to the UE, wherein the search space set comprises a number of PDCCH candidates, each comprising one or more CCEs, and wherein PDCCH(s) associated with said search space set are transmitted on one or more CORESET(s) associated with the search space set and hence, the CCEs corresponding to a PDCCH candidate in the search space set may be mapped to one or more of the associated CORESETs.

As previously described and according to an embodiment, a method performed by the network node may comprise receiving from the UE a report including a parameter that indicates whether the UE is capable of individual/selective decoding and/or joint/combined decoding/processing of PDCCH candidates that are associated with the same DCI or the same DCI content. For example, the parameter may be titled 'decodingDCIfromMultiplePDCCHcandidates' and the values taken may be 'selection', 'combining' or 'selectionAndCombining'.

The method performed by the network node may further comprise receiving from the UE, in the report or in another report, a parameter that indicates the number of PDCCH candidates it may combine/jointly process to perform blind decoding in search of a valid DCI when multiple PDCCH candidates may be associated with the same DCI or same DCI content. For example, the parameter may be titled 'numberOfBDPDCCHcandidatesForCombinedDecoding' and may take an integer value, e.g., 1, 2, 4.

The method performed by the network may further comprise receiving from the UE, in the same report or in another report, a parameter that indicates the number of PDCCH candidates it may attempt to blindly decode individually to obtain a DCI when multiple PDCCH candidates may be associated with the same DCI or same DCI content. For example, the parameter may be titled 'numberOfBDPDCCHcandidatesForSelectiveDecoding' and may take an integer value, e.g., 1, 2, 4.

The method performed by the network may further comprise receiving from the UE, in the report or in another report, a value or which method of counting the PDCCH candidates or blind decoding attempts applies to the UE. Additional actions performed by the network node have already been described.

Figure 10:
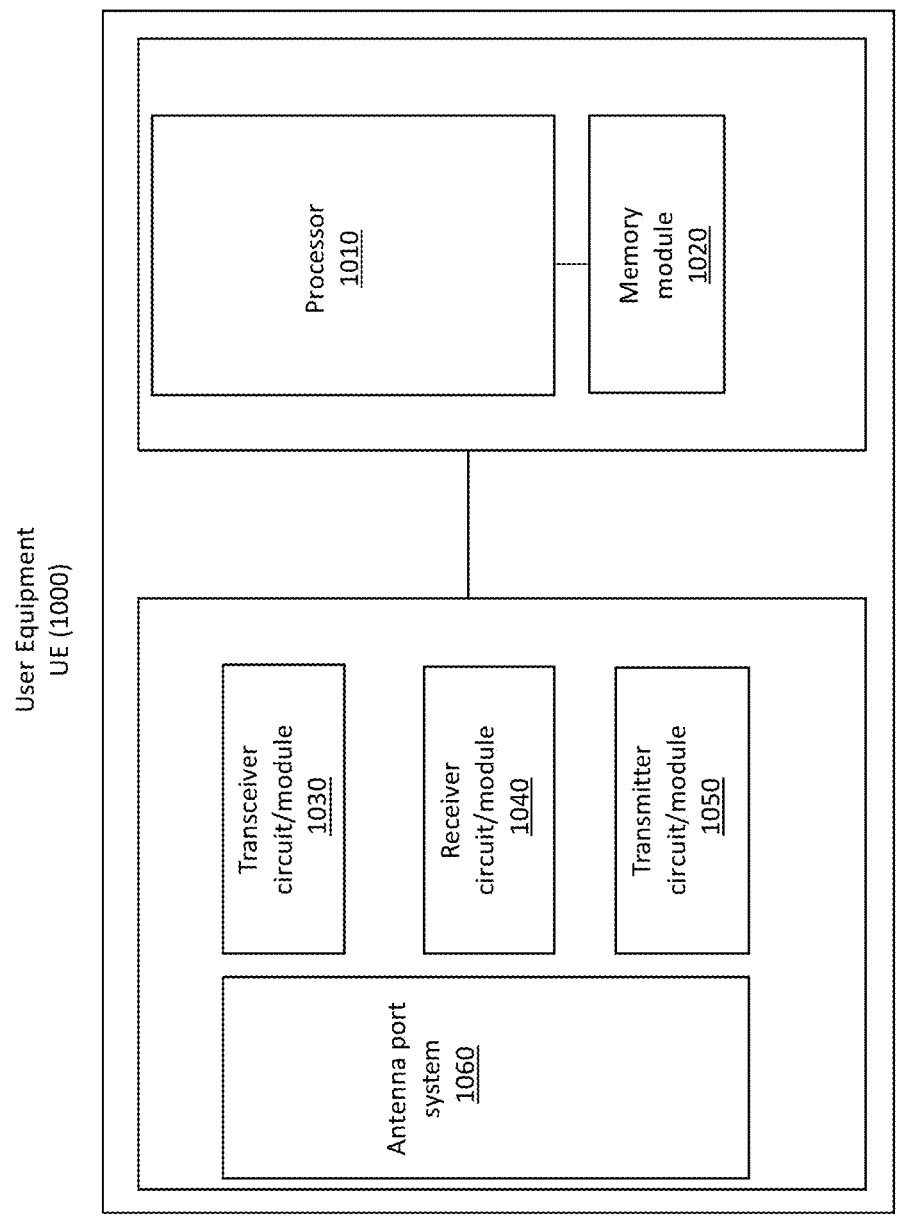
FIG. 10 illustrates a block diagram depicting a UE according to some embodiments herein.

In order to perform the previously described process or method steps performed by the UE there is also provided a UE. FIG. 10 illustrates a block diagram depicting a UE. The UE 1000 comprises a processor 1010 or processing circuit or a processing module or a processor or means 1010; a receiver circuit or receiver module 1040; a transmitter circuit or transmitter module 1050; a memory module 1020, a transceiver circuit or transceiver module 1030 which may include the transmitter circuit 1050 and the receiver circuit 1040. The UE 1000 further comprises an antenna system 1060 which includes antenna circuitry for transmitting and receiving signals to/from at least the network node. The antenna system employs beamforming as previously described. The actions performed by the UE have already been described.

The UE 1000 may belong to any radio access technology including 4G or LTE, LTE-A, 5G, advanced 5G or a combination thereof that support beamforming technology. The UE comprising the processor 1010 and the memory 1020 contains instructions executable by the processor 1010, whereby the UE 1000 is operative to perform any one of the embodiments related to the UE previously described.

The processing module/circuit 1010 includes a processor, microprocessor, an application specific integrated circuit (ASIC), field programmable gate array (FPGA), or the like, and may be referred to as the "processor." The processor 1010 controls the operation of the network node and its components. Memory (circuit or module) 1020 includes a random-access memory (RAM), a read only memory (ROM), and/or another type of memory to store data and instructions that may be used by processor 1010. In general, it will be understood that the UE 1000 in one or more embodiments includes fixed or programmed circuitry that is configured to carry out the operations in any of the embodiments disclosed herein.

In at least one such example, the processor 1010 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure relating to the UE. Further, it will be appreciated that the UE 1000 may comprise additional components.

Figure 11:
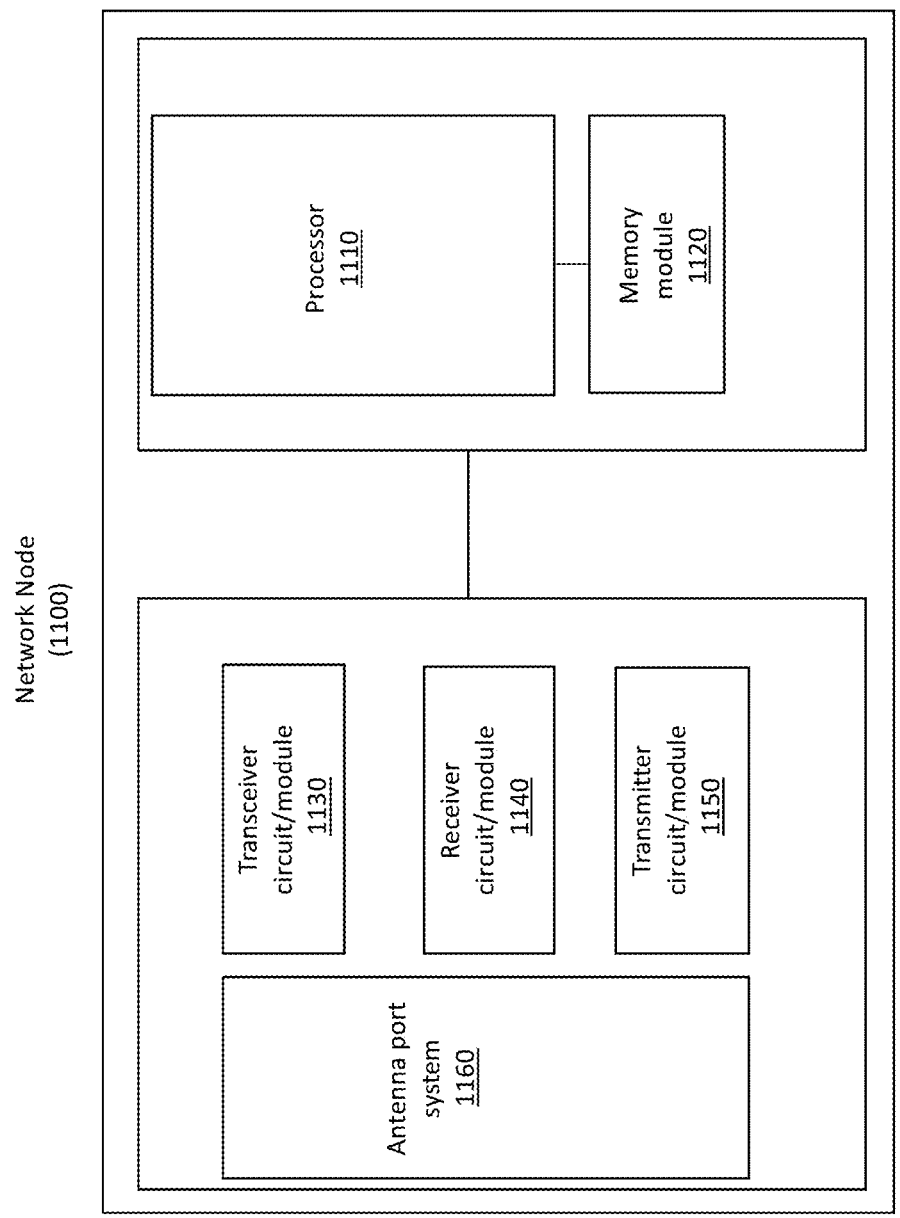
FIG. 11 illustrates a block diagram depicting a network node according to some embodiments herein

In order to perform the previously described process or method steps performed by the network node, there is also provided a network node (or gNB). FIG. 11 illustrates an exemplary block diagram of a network node. The network node 1100 comprises a processor 1110 or processing circuit or a processing module or a processor or means 1110; a receiver circuit or receiver module 1140; a transmitter circuit or transmitter module 1150; a memory module 1120 a transceiver circuit or transceiver module 1130 which may include the transmitter circuit 1150 and the receiver circuit 1140. The network node 1100 further comprises an antenna system 1160 which includes antenna circuitry for transmitting and receiving signals to/from at least the UE. The antenna system employs beamforming as previously described. The actions performed by the network node have already been described. The network node may also be viewed as a TRP.

The processing module/circuit 1110 includes a processor, microprocessor, an application specific integrated circuit (ASIC), field programmable gate array (FPGA), or the like, and may be referred to as the "processor." The processor 1110 controls the operation of the network node and its components. Memory (circuit or module) 1120 includes a random-access memory (RAM), a read only memory (ROM), and/or another type of memory to store data and instructions that may be used by processor 1110. In general, it will be understood that the network node in one or more embodiments includes fixed or programmed circuitry that is configured to carry out the operations in any of the embodiments disclosed herein.

In at least one such example, the processor 1110 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node may comprise additional components.

The network node 1100 may belong to any radio access technology including 4G or LTE, LTE-A, 5G, advanced 5G or a combination thereof that support beamforming technology. The network node comprising the processor and the memory contains instructions executable by the processor, whereby the network node 1100 is operative to perform any one of the subject-disclosed in this disclosure related to the network node.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including LTE or 4G, LTE-A (or LTE-Advanced), 5G, advanced 5G, WiMAX, WiFi, satellite communications, TV broadcasting etc.

REFERENCES

[1] 3GPP TS 38.211 V16.0.0: "3GPP; TSG RAN; NR; Physical channels and modulation (Rel. 16)," January 2020.
[2] 3GPP TS 38.212 V16.0.0: "3GPP; TSG RAN; NR; Multiplexing and channel coding (Rel. 16)," January 2020.
[3] 3GPP TS 38.213 V16.0.0: "3GPP; TSG RAN; NR; Physical layer procedures for control (Rel. 16)," January 2020.
[4] 3GPP TS 38.214 V16.0.0: "3GPP; TSG RAN; NR; Physical layer procedures for data (Rel. 16)," January 2020.
[5] 3GPP TS 38.321 V15.8.0: "3GPP; TSG RAN; NR; Medium Access Control (MAC) protocol specification (Rel. 15)," January 2020.
[6] 3GPP TS 38.331 V15.8.0: "3GPP; TSG RAN; NR; Radio Resource Control (RRC); Protocol specification (Rel. 15)," January 2020.
[7] 3GPP TS 38.101-1 V16.2.0: "3GPP; TSG RAN; User Equipment (UE) radio transmission and reception; Part 1: Range 1 Standalone (Rel. 16)," January 2020.

The invention claimed is:

1. A method performed by a User Equipment (UE), the method comprising:
receiving from a network node, via a higher layer, a configuration of one or more search space sets which are associated with one or more control resource sets (CORESETs), for one or more Physical Downlink Control Channels (PDCCHs), wherein each search space set is associated with a CORESET and comprises a number of PDCCH candidates and each PDCCH candidate comprises a number of resource elements or control channel elements (CCEs) and the UE monitoring for one or more Downlink Control Information (DCIs) of a format or formats as indicated via the higher layer in the configured PDCCH candidates;
receiving from the network node, via the higher layer, a configuration or indication of an association of one or more of said search space sets with a search space set pool, wherein the higher layer configuration of a search space set comprises a parameter that comprises a value of a search space set pool ID, index, or indicator, and wherein at least two PDCCH candidates from one or more search space sets in the search space set pool that are associated with the same slot, comprise or carry a same DCI content; and
applying the configuration or indication of the association for receiving one or more PDCCHs on the one or more search space sets.

2. The method according to claim 1, further comprising at least one of combining and processing together multiple PDCCHs received on different PDCCH candidates during decoding of said one or more DCIs.

3. The method according to claim 1, wherein the PDCCH candidates of the search space sets in the search space set pool that are associated with the same DCI content comprise the same numbers of CCEs or different number of CCEs or are associated with the same aggregation level.

4. The method according to claim 1, wherein the i-th PDCCH candidates of aggregation level L of the at least two search space sets in the search space set pool are associated with the same DCI content.

5. The method according to claim 1, wherein the search space sets in a search space set pool are configured with an identical set of aggregation levels and an identical number of PDCCH candidates for each aggregation level.

6. The method according to claim 1, further comprising receiving from the network node a higher layer indication or configuration that provides an association of one or more search space sets with the search space set pool, wherein a value of at least one of the following parameters configured for a search space set in said search space pool is identical to the corresponding parameter configured for another search space set within said search space set pool: search space type, DCI format(s) to be monitored, monitoring slot periodicity and offset, search space duration and downlink bandwidth where frequency domain resources of the associated CORESET are configured.

7. The method according to claim 1, wherein each CORESET is associated with a parameter CORESETpoolIndex, and wherein at least two CORESETs associated with two different search space sets in the search space set pool are configured with different values of the parameter CORESETpoolIndex.

8. The method according to claim 1, further comprising monitoring a set of PDCCH candidates in one or more CORESETs on an active downlink bandwidth part on each activated serving cell configured with PDCCH monitoring according to corresponding search space sets.

9. The method according to claim 1, further comprising reporting to the network node, a capability of the UE indicating the number of PDCCHs and/or DCIs that the UE is capable of decoding in a slot in a serving cell.

10. The method according to claim 1, further comprising, receiving from the network node, via the physical layer or via a higher layer, an indication regarding at least one of the following:
   an activation or formation of the association between at least one PDCCH candidate in a search space set and at least one other PDCCH candidate in the same search space set or a different search space set associated with the same or a different CORESET; and
   a deactivation or termination of the association between at least one PDCCH candidate in a search space set and at least one other PDCCH candidate in the same search space set or a different search space set associated with the same or a different CORESET.

11. The method according to claim 1, further comprising configuring the PDCCH candidates in a given slot, or in a given span in a cell, wherein a group g of PDCCH candidates comprises $p_g > 1$ PDCCH candidates which are associated with the same DCI content.

12. The method according to claim 11, further comprising performing a number of blind decoding attempts counted for group g in the given slot, or in the given span in the cell, wherein the number of blind decoding attempts is one of the following:
   one blind decoding attempt; and
   a number $s_g$ of blind decoding attempts, wherein $s_g$ is less or equal to twice the number of PDCCH candidates in said group g.

13. The method according to claim 1, wherein if two or more search space sets are present in a search space set pool, the i-th PDCCH candidates or the PDCCH candidates with index i of aggregation level L of the at least two search space sets in the search space set pool are associated with the same DCI or DCI content.

14. The method according to claim 12, further comprising reporting to a network node or receiving from the network node via the PHY layer or a higher layer one of the following:
   one or more values for the number of monitored PDCCH candidates and/or monitored CCEs and/or blind decoding attempts that are counted towards the UE's blind decoding capability with respect to a group of PDCCH candidates that are associated with the same DCI or DCI content; or
   one or more indices or parameters, each of which indicates a number of monitored PDCCH candidates and/or monitored CCEs and/or blind decoding attempts that are counted towards the UE's blind decoding capability with respect to a group of PDCCH candidates that are associated with the same DCI or DCI content.

15. The method of claim 1, further comprising receiving a PDCCH/DCI associated with more than one PDCCH candidate that schedules at least one PUSCH transmission, wherein the PDCCH/DCI comprises at least one SRS resource indicator (SRI) field or at least one SRI value that is associated with an SRS resource or SRS resource set transmission most recently transmitted by the UE before a certain time $\hat{t}$, wherein $\hat{t}$ is determined based on at least one of the following:
   the PDCCH candidate or a symbol of the PDCCH candidate that starts or ends the earliest in time among the PDCCH candidates associated with said DCI; and
   a slot in which the PDCCH candidate that starts or ends earliest in time among the PDCCH candidates associated with said DCI is received.

16. The method according to claim 1, further comprising reporting to the network node at least one of the following capabilities of the UE:
   one or more values related to number of monitored PDCCH candidates and/or monitored CCEs and/or blind decoding attempts that may be counted towards the UE's monitoring or blind decoding capability with respect to a group of PDCCH candidates that are associated with the same DCI content;
   a decoding method employed at the UE or the capability of the UE to employ a certain specific decoding method, which includes one or more of soft-combining, joint processing,
   selective decoding to decode a DCI that is associated with more than one PDCCH candidate;
   a maximum number of search space set pools that can be supported in a given downlink bandwidth part and/or cell;
   the maximum number of PDCCH candidates that can be monitored in a slot or span in a cell if the UE is capable of decoding a DCI associated with more than one PDCCH candidate, which may be subject to a number of groups of associated PDCCH candidates in given slot or span; and
   the maximum number of CORESETs that can contain search space sets that are associated with search space set pools.

17. A User Equipment (UE) comprising a processor and a memory containing instructions executable by the processor whereby said UE is configured to:
- receive from a network node, via a higher layer, a configuration of one or more search space sets which are associated with one or more control resource sets (CORESETs), for one or more Physical Downlink Control Channels (PDCCHs), wherein each search space set is associated with a CORESET and comprises a number of PDCCH candidates and each PDCCH candidate comprises a number of resource elements or control channel elements (CCEs) and the UE monitoring for one or more Downlink Control Information (DCIs) of a format or formats as indicated via the higher layer in the configured PDCCH candidates;
- receive from the network node, via the higher layer, a configuration or indication of an association of one or more of said search space sets with a search space set pool, wherein the higher layer configuration of a search space set comprises a parameter that comprises a value of a search space set pool ID, index, or indicator, and wherein at least two PDCCH candidates from one or more search space sets in the search space set pool that are associated with the same slot, comprise or carry a same DCI content; and
- apply the configuration or indication of the association for receiving one or more PDCCHs on the one or more search space sets.

18. A method performed by a network node, the method comprising:
- transmitting to a User Equipment (UE) via a higher layer, a configuration of one or more search space sets which are associated with one or more control resource sets (CORESETs), for one or more Physical Downlink Control Channels (PDCCHs), wherein each search space set is associated with a CORESET and comprises a number of PDCCH candidates and each PDCCH candidate comprises a number of control channel elements (CCEs), for enabling the UE to monitor one or more Downlink Control Information (DCIs) of a format or formats as indicated via the higher layer in the configured PDCCH candidates;
- transmitting to the UE, via a higher layer, a configuration or an indication of an association of one or more said search space sets with a search space set pool;
- wherein the higher layer configuration of a search space set comprises a parameter that comprises a value of a search space set pool ID, index or indicator,
- wherein at least two PDCCH candidates from one or more search space sets in the search space set pool that are associated with the same slot, comprise or carry the same DCI content, and;
- transmitting to the UE, one or more PDCCHs on the one or more search space sets.

19. A network node comprising a processor and a memory containing instructions executable by the processor, whereby said network node is configured to:
- transmit to a User Equipment (UE) via a higher layer, a configuration of one or more search space sets which are associated with one or more control resource sets (CORESETs), for one or more Physical Downlink Control Channels (PDCCHs), wherein each search space set is associated with a CORESET and comprises a number of PDCCH candidates and each PDCCH candidate comprises a number of control channel elements (CCEs), for enabling the UE to monitor one or more Downlink Control Information (DCIs) of a format or formats as indicated via the higher layer in the configured PDCCH candidates;
- transmit to the UE, via a higher level, a configuration or an indication of an association of one or more said search space sets with a search space set pool;
- wherein the higher layer configuration of a search space set comprises a parameter that comprises a value of a search space set pool ID, index or indicator,
- wherein at least two PDCCH candidates from one or more search space sets in the search space set pool, that are associated with the same slot, comprise or carry the same DCI content and;
- transmit to the UE, one or more PDCCHs on the one or more search space sets.

* * * * *